United States Patent
Matsuzaki et al.

(10) Patent No.: US 7,916,346 B2
(45) Date of Patent: Mar. 29, 2011

(54) IMAGE FORMING APPARATUS, IMAGE PROCESSING APPARATUS, IMAGE PROCESSING METHOD, COMPUTER DATA SIGNAL, AND COMPUTER READABLE MEDIUM

(75) Inventors: Yoshiki Matsuzaki, Kanagawa (JP); Toshiyuki Kazama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 631 days.

(21) Appl. No.: 11/798,484

(22) Filed: May 14, 2007

(65) Prior Publication Data
US 2008/0158606 A1    Jul. 3, 2008

(30) Foreign Application Priority Data
Dec. 28, 2006    (JP) .................................. 2006-354511

(51) Int. Cl.
*H04N 1/60* (2006.01)
(52) U.S. Cl. ....... 358/1.9; 358/1.14; 358/1.18; 358/504; 347/19; 399/49; 399/394
(58) Field of Classification Search .................. 358/1.9, 358/3.26, 504; 399/394, 49; 347/19
See application file for complete search history.

(56) References Cited

U.S. PATENT DOCUMENTS

| | | | | |
|---|---|---|---|---|
| 5,300,961 A * | 4/1994 | Corona et al. | ................ | 347/116 |
| 5,510,896 A * | 4/1996 | Wafler | ........................... | 358/296 |
| 5,517,587 A * | 5/1996 | Baker et al. | .................... | 382/296 |
| 5,631,981 A * | 5/1997 | Rao | ................................ | 382/278 |
| 5,715,498 A * | 2/1998 | Takeuchi et al. | ................ | 399/40 |
| 5,995,802 A * | 11/1999 | Mori et al. | ...................... | 399/394 |
| 6,360,026 B1 * | 3/2002 | Kulkarni et al. | ............... | 382/289 |
| 6,380,960 B1 * | 4/2002 | Shinohara | ...................... | 347/116 |
| 6,891,630 B1 * | 5/2005 | Miyasaka et al. | ............... | 358/1.1 |
| 7,123,851 B2 * | 10/2006 | Tomita et al. | .................... | 399/49 |
| 7,305,146 B2 * | 12/2007 | Cheatle | ........................... | 382/296 |
| 7,668,404 B2 * | 2/2010 | Adams et al. | ................. | 382/289 |
| 2003/0174364 A1 * | 9/2003 | Goto | ............................. | 358/3.26 |
| 2007/0223017 A1 * | 9/2007 | Ogawa et al. | .................. | 358/1.9 |

FOREIGN PATENT DOCUMENTS

| | | |
|---|---|---|
| JP | 2000-112206 | 4/2000 |
| JP | 2002-60097 | 2/2002 |
| JP | 2003-131525 | 5/2003 |
| JP | 3769913 | 2/2006 |

* cited by examiner

*Primary Examiner* — King Y Poon
*Assistant Examiner* — Richard Zhu
(74) *Attorney, Agent, or Firm* — Morgan, Lewis & Bockius LLP

(57) ABSTRACT

An image forming apparatus includes an image forming unit that forms an image on a recording medium within a predetermined width for image formation, a deviation amount obtaining unit that obtains an amount of a deviation formed on a recording sheet by the image forming unit, a correcting unit that corrects image data of an image to be formed by the image forming unit, on the basis of the obtained amount of a deviation, a deficiency amount calculating unit that calculates an amount of a deficiency of an image which occurs in an area beyond the predetermined width for image formation as a result of the correction by the correcting unit, and the correcting unit is further configured to correct image data of an image to be formed by the image forming unit, on the basis of the calculated amount of a deficiency.

13 Claims, 17 Drawing Sheets

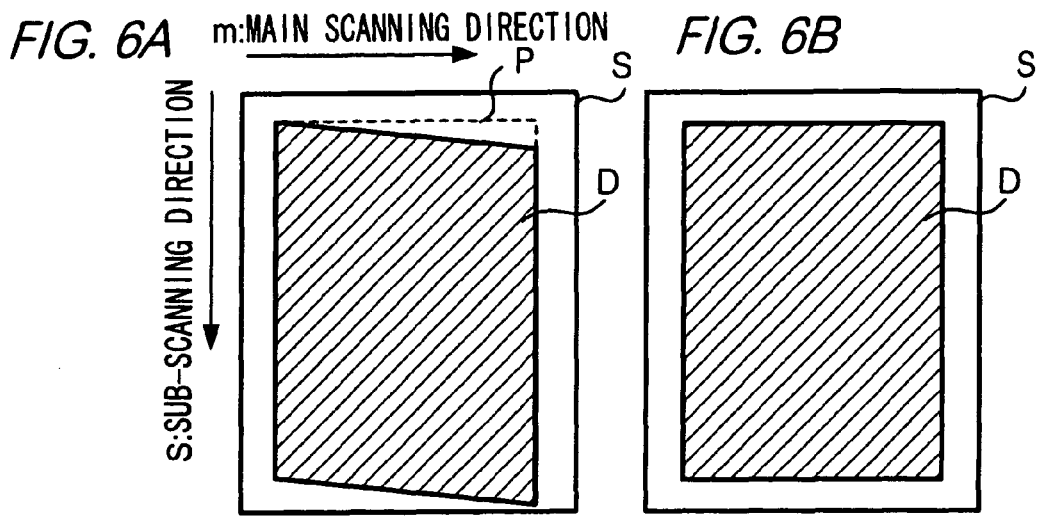
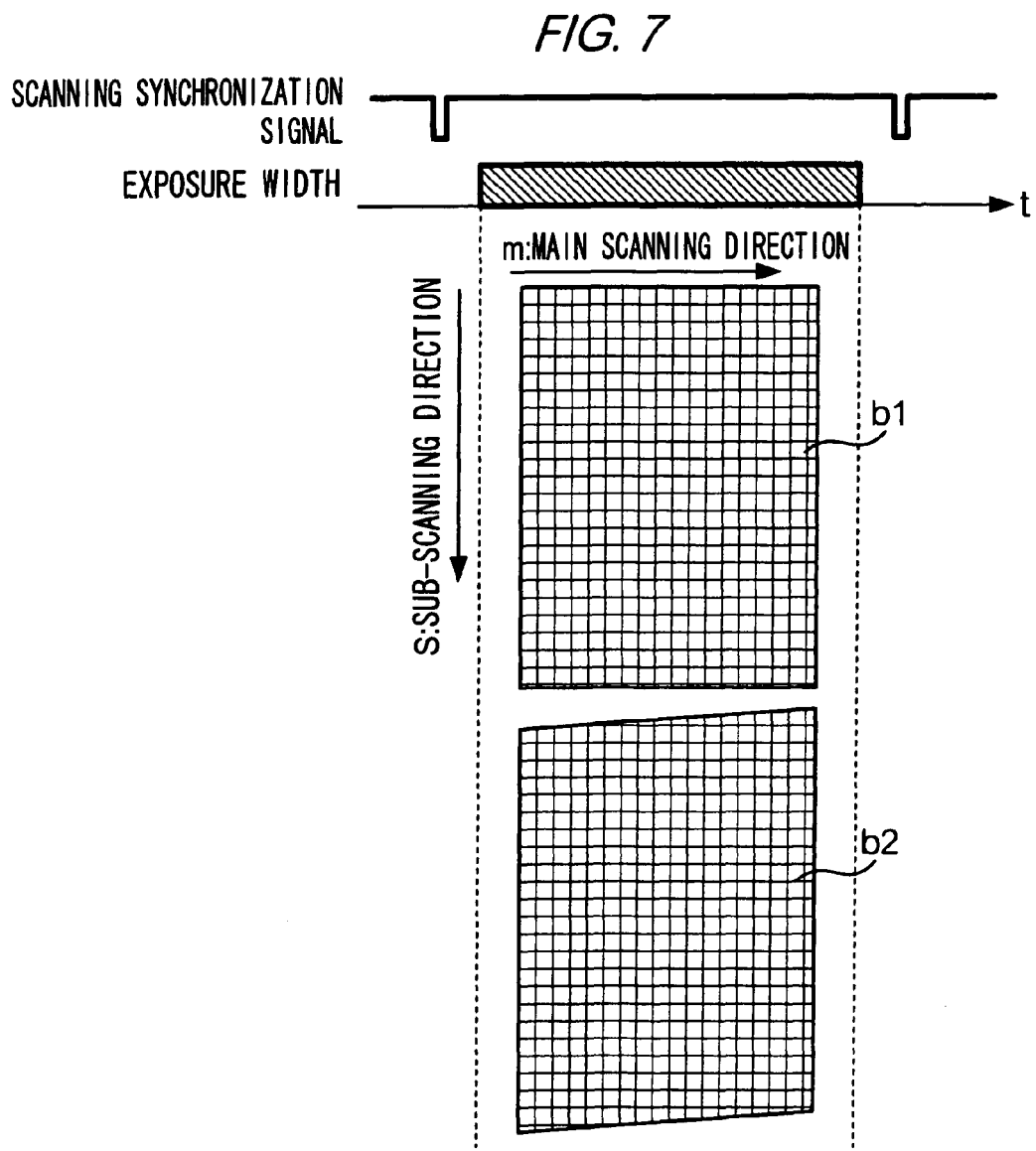

FIG. 13

| EXPOSURE WIDTH |
|---|
| 323 (mm) |

| IMAGE SIZE | | INCREASE IN WIDTH BY SIDE SKEW CORRECTION | SIDE REGISTRATION CORRECTION AMOUNT (±) | FUSER OSCILLATION (±) | COLOR REGISTRATION CORRECTION AMOUNT (±) | IMAGE WIDTH | LATERAL FLUCTUATION RANGE (±) | EXPOSURE WIDTH MARGIN (ONE SIDE) |
|---|---|---|---|---|---|---|---|---|
| MAIN | SUB | A | B | C | D | MAIN+A | B+C+D | |
| 297 | 420 | 3.15 | 4 | 2 | 2 | 300.15 | 8.00 | 3.43 |
| 298 | 423 | 3.17 | 4 | 2 | 2 | 301.17 | 8.00 | 2.91 |
| 299 | 425 | 3.19 | 4 | 2 | 2 | 302.19 | 8.00 | 2.41 |
| 300 | 428 | 3.21 | 4 | 2 | 2 | 303.21 | 8.00 | 1.90 |
| 301 | 430 | 3.23 | 4 | 2 | 2 | 304.23 | 8.00 | 1.39 |
| 302 | 433 | 3.25 | 4 | 2 | 2 | 305.25 | 8.00 | 0.88 |
| 303 | 436 | 3.27 | 4 | 2 | 2 | 306.27 | 8.00 | 0.37 |
| 304 | 438 | 3.29 | 4 | 2 | 2 | 307.29 | 8.00 | -0.14 |
| 305 | 441 | 3.31 | 4 | 2 | 2 | 308.31 | 8.00 | -0.65 |
| 306 | 443 | 3.32 | 4 | 2 | 2 | 309.32 | 8.00 | -1.16 |
| 307 | 446 | 3.35 | 4 | 2 | 2 | 310.35 | 8.00 | -1.67 |
| 308 | 449 | 3.37 | 4 | 2 | 2 | 311.37 | 8.00 | -2.18 |
| 309 | 451 | 3.38 | 4 | 2 | 2 | 312.38 | 8.00 | -2.69 |
| 310 | 454 | 3.41 | 4 | 2 | 2 | 313.41 | 8.00 | -3.20 |
| 311 | 457 | 3.43 | 4 | 2 | 2 | 314.43 | 8.00 | -3.71 |
| 312 | 459 | 3.44 | 4 | 2 | 2 | 315.44 | 8.00 | -4.22 |
| 313 | 462 | 3.47 | 4 | 2 | 2 | 316.47 | 8.00 | -4.73 |
| 314 | 464 | 3.48 | 4 | 2 | 2 | 317.48 | 8.00 | -5.24 |
| 315 | 467 | 3.50 | 4 | 2 | 2 | 318.50 | 8.00 | -5.75 |
| 316 | 470 | 3.53 | 4 | 2 | 2 | 319.53 | 8.00 | -6.26 |
| 317 | 472 | 3.54 | 4 | 2 | 2 | 320.54 | 8.00 | -6.77 |
| 318 | 475 | 3.56 | 4 | 2 | 2 | 321.56 | 8.00 | -7.28 |
| 319 | 477 | 3.58 | 4 | 2 | 2 | 322.58 | 8.00 | -7.79 |
| 320 | 488 | 3.60 | 4 | 2 | 2 | 323.60 | 8.00 | -8.30 |

Ta

UNIT: mm

FIG. 16
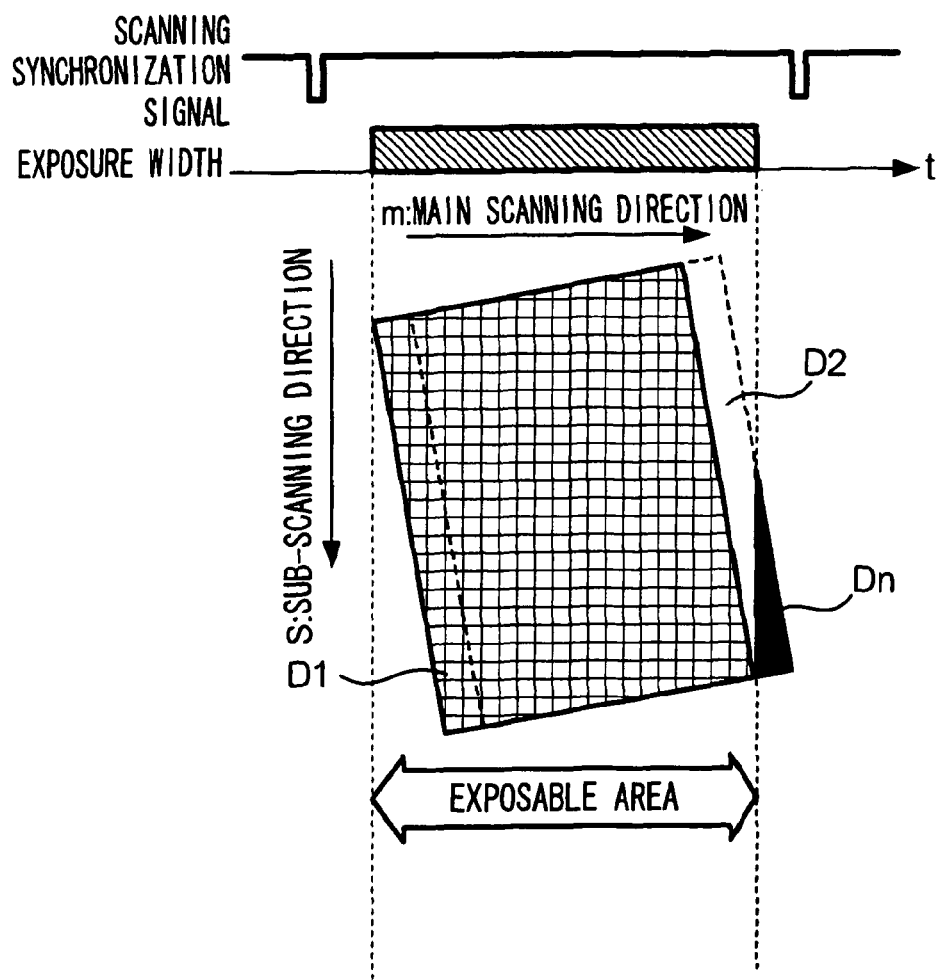
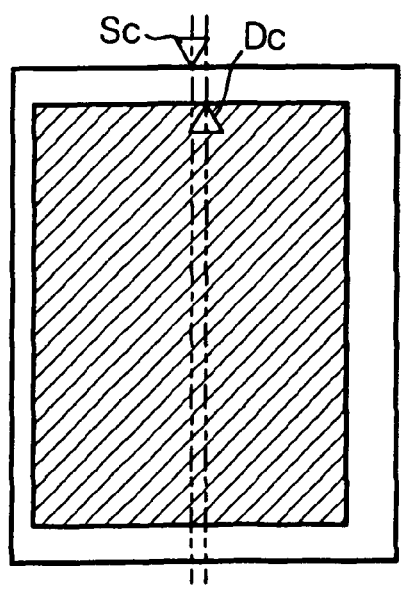

IMAGE FORMING APPARATUS, IMAGE PROCESSING APPARATUS, IMAGE PROCESSING METHOD, COMPUTER DATA SIGNAL, AND COMPUTER READABLE MEDIUM

This application is based on and claims priority under 35 USC 119 from Japanese Patent Application No. 2006-354511 filed on Dec. 28, 2006.

BACKGROUND

1. Technical Field

The present invention relates to an image forming apparatus, an image processing apparatus, an image processing method, a computer data signal, and a computer readable medium.

2. Related Art

An electrophotographic image forming apparatus forms a toner image on an image holder such as a photoreceptor, and causes the image holder to transfer the toner image onto a recording material. However, during the process, an image formed on a recording material may be misaligned.

SUMMARY

An aspect of the present invention provides an image forming apparatus including an image forming unit that forms an image on a recording medium within a predetermined width for image formation, a deviation amount obtaining unit that obtains an amount of a deviation formed on a recording sheet by the image forming unit, a correcting unit that corrects image data of an image to be formed by the image forming unit, on the basis of the amount of a deviation obtained by the deviation amount obtaining unit, and a deficiency amount calculating unit that calculates an amount of a deficiency of an image which occurs in an area beyond the predetermined width for image formation as a result of the correction by the correcting unit, wherein the correcting unit is further configured to correct image data of an image to be formed by the image forming unit, on the basis of the amount of a deficiency calculated by the deficiency amount calculating unit.

BRIEF DESCRIPTION OF THE DRAWINGS

Exemplary embodiments of the present invention will now be described in detail with reference to the following figures, wherein:

FIGS. 6A and 6B are diagrams illustrating a correction of squareness misalignment;

FIG. 7 is a diagram illustrating a correction of squareness misalignment;

FIG. 13 is a diagram illustrating an example of a deficiency amount table;

FIG. 16 is a diagram illustrating a first correction method;

DETAILED DESCRIPTION

An exemplary embodiment of the present invention will be described below.

(1) Configuration (1-1) Configuration of Image Forming Apparatus 10

Figure 1:
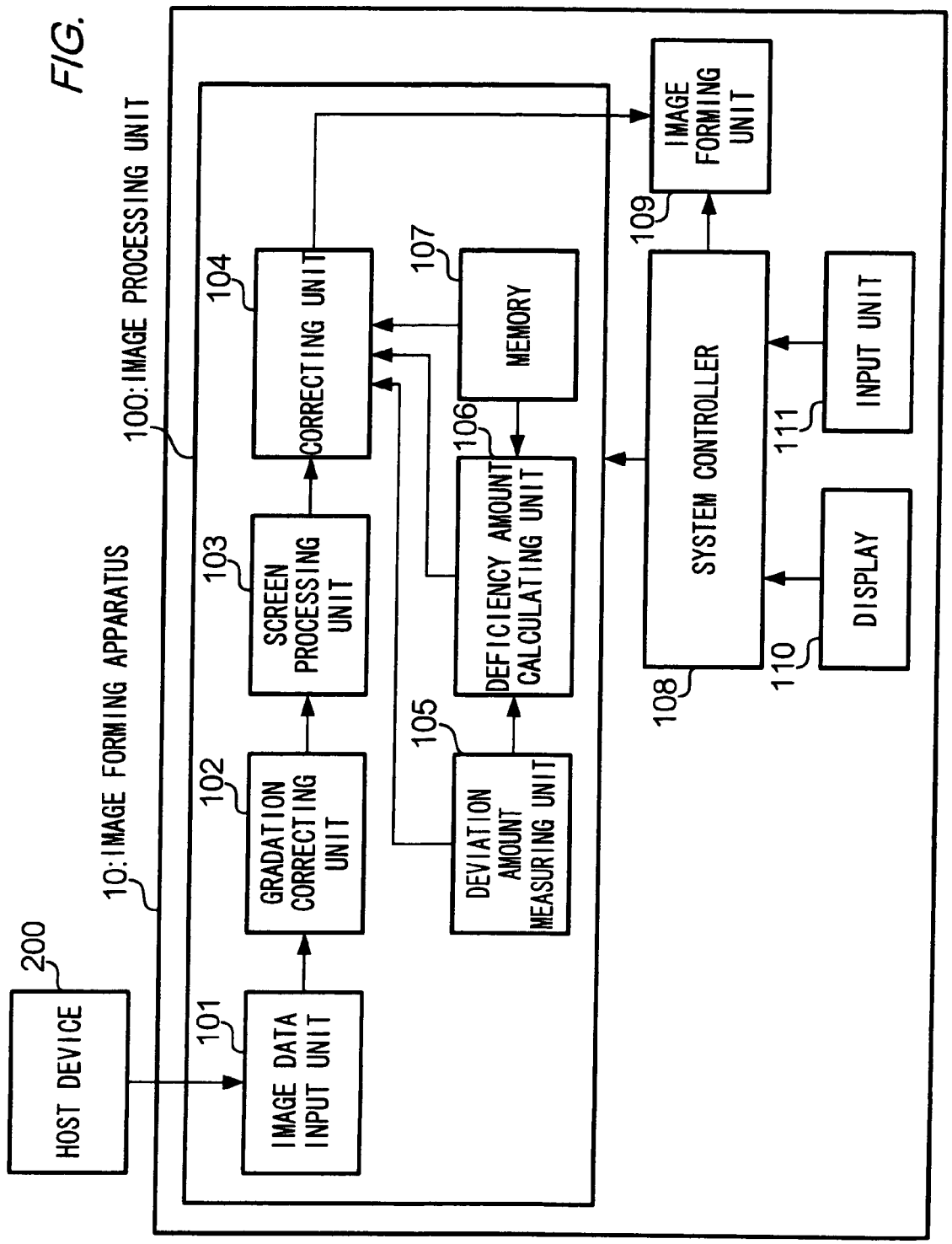
FIG. 1 is a diagram illustrating a configuration of an image forming apparatus according to an exemplary embodiment of the present invention.

FIG. 1 is a diagram illustrating a configuration of image forming apparatus 10 according to the present exemplary embodiment. Image forming apparatus 10 may be an electrophotographic image forming apparatus such as a color printer or a color copier. Image forming apparatus 10 includes image processing unit 100 for image processing, system controller 108, image forming unit 109, display 110, and input unit 111. Image processing unit 100 includes image data input unit 101, gradation correcting unit 102, screen processing unit 103, correcting unit 104, deviation amount measuring unit 105, deficiency amount calculating unit 106, and memory 107. The units 101 to 107 are realized by cooperation of a control circuit such as an ASIC (Application Specific Integrated Circuit), or a CPU (Central Processing Unit), and a variety of memories.

Image data input unit 101 includes a communication circuit (not shown), and receives image data from host device 200, which may be a personal computer, via a network or a communication line. The image data may be described in the PDL (Page Description Language). Image data input unit 101 rasterizes received image data to generate bit-mapped image data, for example, of 600 dpi (hereinafter refereed to as simply "bitmap data"). The term "dpi" is an abbreviation of "dots per inch".

Gradation correcting unit 102 performs a gradation correction of bitmap data generated by image data input unit 101.

Screen processing unit 103 performs a screen processing of bitmap data subjected to a gradation correction by gradation correcting unit 102.

Correcting unit 104 processes bitmap data subjected to a screen processing by screen processing unit 103 to correct an image forming position, and provides the processed bitmap data to image forming unit 109.

Image forming unit 109 forms an image on a recording sheet on the basis of bitmap data provided by image processing unit 100.

Display 110 displays a variety of information such as operation screens.

Input unit 111 receives an input by a user, and provides a signal corresponding to the received input to system controller 108.

System controller 108 controls the components of image forming apparatus 10 such as display 110. System controller 108 may perform the control in accordance with a signal provided from input unit 111.

Figure 2:
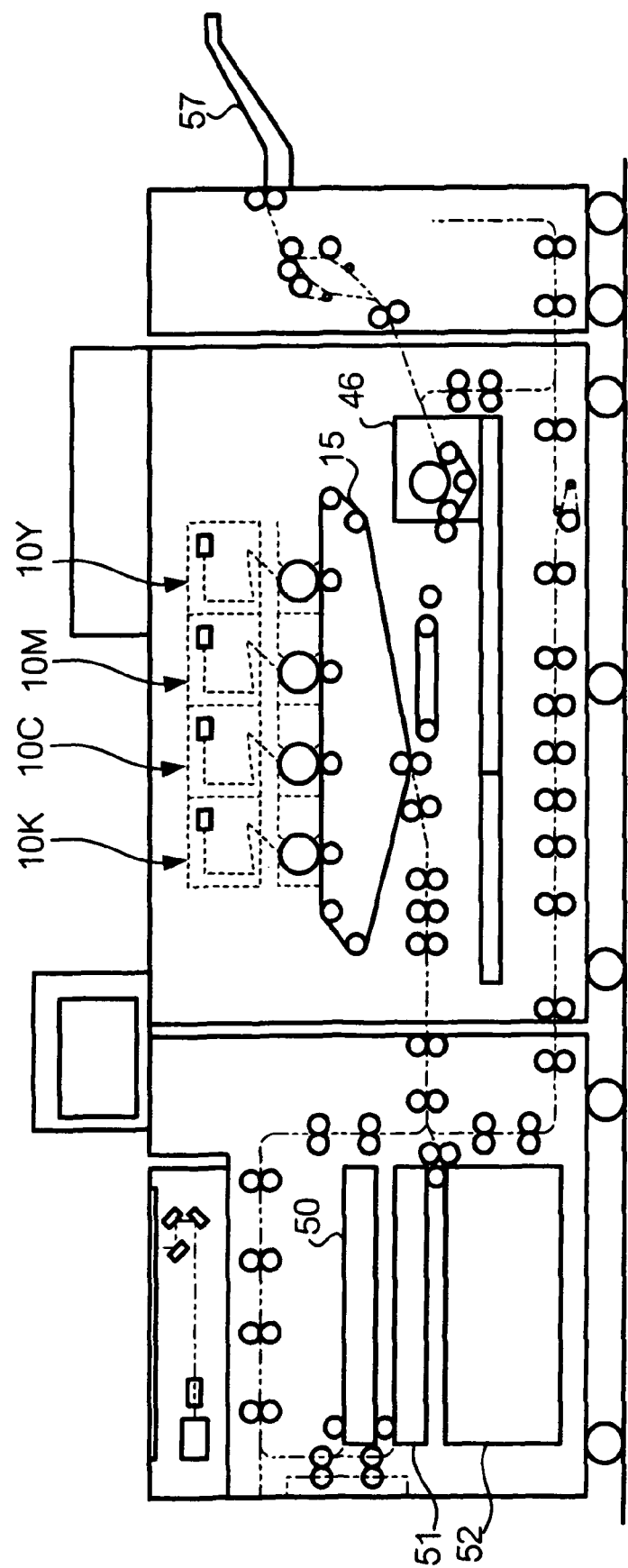
FIG. 2 is a diagram illustrating a configuration of an image forming unit.

Now, a configuration of image forming unit 109 will be described with reference to FIG. 2.

As shown in the drawing, image forming unit 109 includes image forming engines 10C, 10M, 10Y, and 10K which house toners of cyan, magenta, yellow, and black, respectively. Each of image forming engines 10C, 10M, 10Y, and 10K includes a photosensitive drum which is an image holder, a charging unit which charges the surface of the photosensitive drum uniformly at a certain potential, an exposure unit which forms an electrostatic latent image on the surface of the photosensitive drum by irradiating light onto the surface of the photosensitive drum in accordance with bitmap data, a development unit which develops an electrostatic latent image with toner to generate a toner image on the surface of the photosensitive drum. A toner image formed by each of the image forming engines 10C, 10M, 10Y, and 10K is transferred onto intermediate transfer belt 15 (the first transfer) which is suspended by plural rolls so as to be rotatable. The transferred toner image is further transferred onto a recording material (the second transfer) which is fed from any of the medium trays 50 to 52. The toner image transferred on a recording material is subject to heating and pressure by fixing unit 46, which is provided in the downstream of intermediate transfer belt 15 relative to image forming engines 10C, 10M, 10Y, and 10K, to be fixed on the recording material. A recording medium subjected to fixing by fixing unit 46 is ejected onto paper output tray 57.

Returning to the explanation of FIG. 1, deviation amount measuring unit 105 measures an amount of a deviation of an image forming position relative to a recording sheet, by reading pattern images formed on a photosensitive drum, intermediate transfer belt 15, or a recording medium. In a case where pattern images are read from intermediate transfer belt 15, the pattern images are formed on the outer surface of intermediate transfer belt 15 by image forming unit 109. The number of pattern images is equal to or more than two and the pattern images are formed in the same straight line in the main scanning direction m or the sub-scanning direction s. Pattern images formed on intermediate transfer belt 15 are read by an optical sensor located near the outer surface of intermediate transfer belt 15, and on the basis of the positions of the read pattern images, an amount of a deviation of an image forming position relative to a recording sheet is measured by deviation amount measuring unit 105.

(1-2) Variation of Misalignment

Figure 3A:
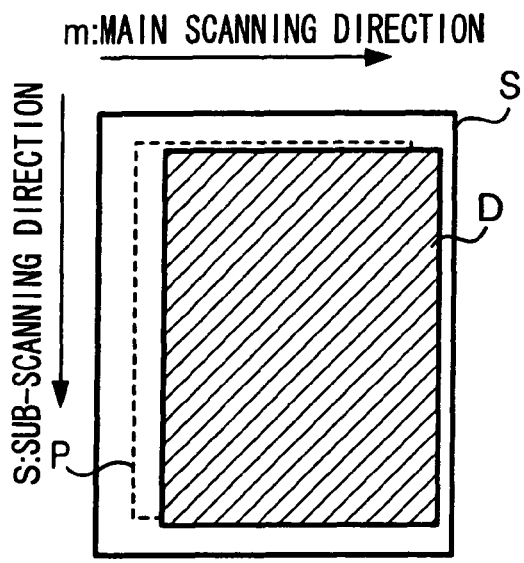
FIGS. 3A to 3C are diagrams illustrating misalignment of an image relative to a recording sheet.
Figure 3B:
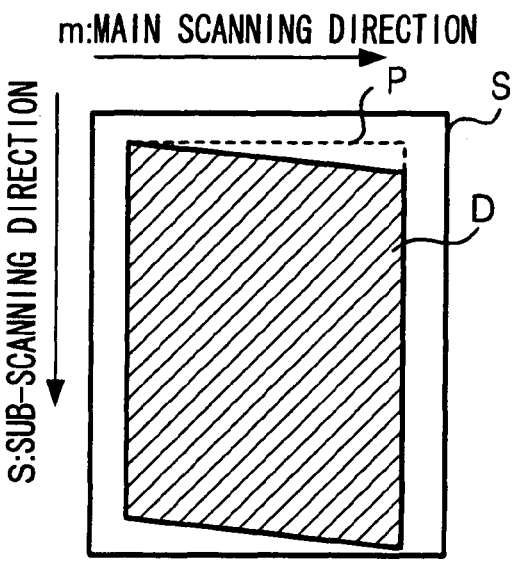
Figure 3C:
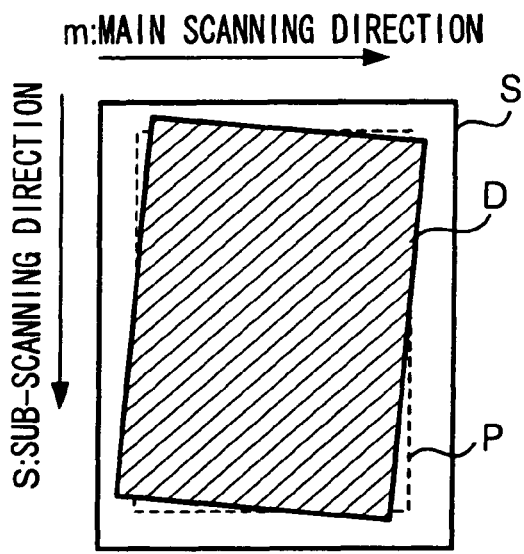

There are various types of misalignments of an image forming position. The present exemplary embodiment provides correcting methods for, among the various types, three types of misalignment as shown in FIGS. 3A to 3C. In the drawing, main scanning direction m is a moving direction of light irradiated on a surface of a photosensitive drum by an exposure unit of image forming unit 109, and sub-scanning direction s is a rotation direction of a photosensitive drum of image forming unit 109 (or a moving direction of a surface of a photosensitive drum). Main scanning direction m and sub-scanning direction s are mutually perpendicular.

FIG. 3A shows a first type of misalignment where an image forming position of image D formed on recording sheet S deviates from ideal image forming position P in the main scanning direction m. Ideal image forming position P is shown by a dotted line in the drawing. The misalignment is referred to as "side registration misalignment".

FIG. 3B shows a second type of misalignment where the upper side and the lower side of an image forming position of image D gradually deviate along main scanning direction m from the upper side and the lower side of ideal image forming position P in sub-scanning direction s. Ideal image forming position P is shown by a dotted line in the drawing. Since the misaligned image forming position of image D has no right-angled corners, the misalignment is referred to as "squareness misalignment". Squareness misalignment includes a case contrasting to that of FIG. 3B, where the upper side and the lower side of an image forming position of image D gradually deviate along main scanning direction m from the upper side and the lower side of ideal image forming position P in a direction opposite to sub-scanning direction s. Also, squareness misalignment includes a case where either upper side or the lower side of an image forming position of image D gradually deviate along main scanning direction m from the upper side or the lower side of ideal image forming position P.

FIG. 3C shows a second type of misalignment where the upper side and the lower side of an image forming position of image D is not parallel to main scanning direction m, and the right side and left side of the image forming position of image D is not parallel to sub-scanning direction s. The misalignment is referred to as "side skew misalignment".

(1-3) Methods of Correcting Misalignment

The three types of misalignments described above are corrected by correcting unit 104 shown in FIG. 1. Correcting unit 104, to the end, obtains a correction approximation function on the basis of the amount of a deviation measured by deviation amount measuring unit 105, and calculates an amount of a correction to be used for correcting misalignment.

For example, in a case where side registration misalignment is corrected, an amount of a correction is equivalent to the number of pixels by which pixels contained in bitmap data are moved in main scanning direction m or the opposite direction.

Figure 4A:
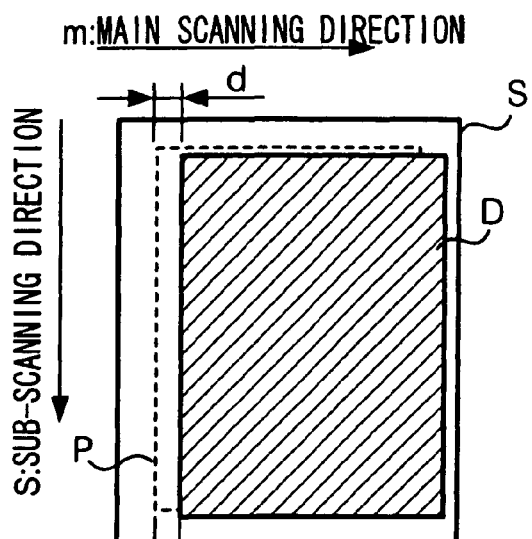
FIGS. 4A and 4B are diagrams illustrating a correction of side registration misalignment.
Figure 4B:
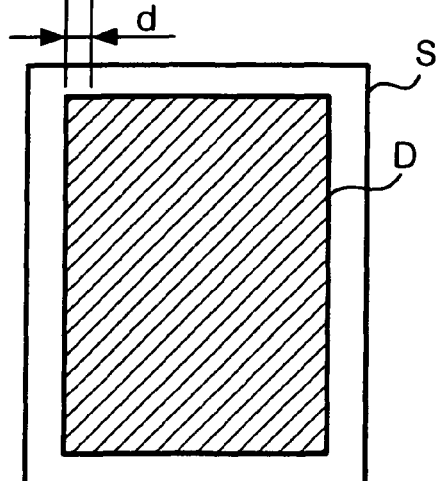

For example, in a case of side registration misalignment shown in FIG. 4A, where an image forming position of image D deviates from ideal image forming position P in main scanning direction m by distance d, if the pixels of image D are moved in a direction opposite to main scanning direction m by distance d by correcting unit 104, the image forming position of image D and ideal image forming position P corresponds with each other as shown in FIG. 4B. In this case, an amount of a correction to be used for correcting bitmap data of image D is equivalent to the number of pixels corresponding to distance d.

In the example shown in FIG. 4A, assuming that the resolution of image D is 2400 dpi, the size of a pixel is 10.58 μm, distance d is 0.1 mm, and one inch is 25.4 mm, an amount of a correction is 0.1/(25.4/2400)=9.4, which is nearly equal to 9 (pixels). Accordingly, under the assumption, correcting unit 104 changes addresses of pixels so that each pixel is moved in a direction opposite to main scanning direction m by nine pixels. When addresses of pixels are changed as just described, the timing of starting an exposure becomes earlier than that of pre-correction by term td corresponding to nine pixels, as shown in a time chart of FIG. 5. In the drawing, "exposure width" means a maximum period when an exposure in main scanning direction m can be made by an exposure unit (this applies to other drawings).

Next, a correction of squareness misalignment will be described.

FIG. 6A is a diagram illustrating a downward-sloping squareness misalignment of image D actually formed on recording sheet S. A "downward-sloping" squareness misalignment is a misalignment where the upper side and the lower side of an image forming position of image D gradually deviate along main scanning direction m from the upper side and the lower side of ideal image forming position P in sub-scanning direction s. To correct the misalignment, correcting unit 104 changes addresses of pixels contained in the bitmap data so that an image represented by the bitmap data is changed to an upward-sloping image. Specifically, correcting unit 104 divides an image represented by bitmap data into plural sections by straight lines parallel to sub-scanning direction s. The number of sections is equivalent to the number of pixels corresponding to a maximum difference between an image represented by bitmap data and ideal image forming position P (in the example shown in FIG. 6A, a difference between the upper right edge of image D and the upper right edge of ideal image forming position P) plus one. The width in main scanning direction m of each section is equally spaced. Correcting unit 104 then moves sections other than the left section in a direction opposite to sub-scanning direction s. In this case, correcting unit 104 moves the second section from the left by one pixel, and moves each of the subsequent sections by one extra pixel as compared with that of the immediate left section. As a result of a correction just described, an image represented by bitmap data b1 of FIG. 7 is changed to an image represented by bitmap data b2. When an image is formed on the basis of bitmap data b2 on recording sheet S, image D which corresponds with ideal image forming position P is formed, as shown in FIG. 6B.

Next, a correction of side skew misalignment will be described.

Figure 8A:
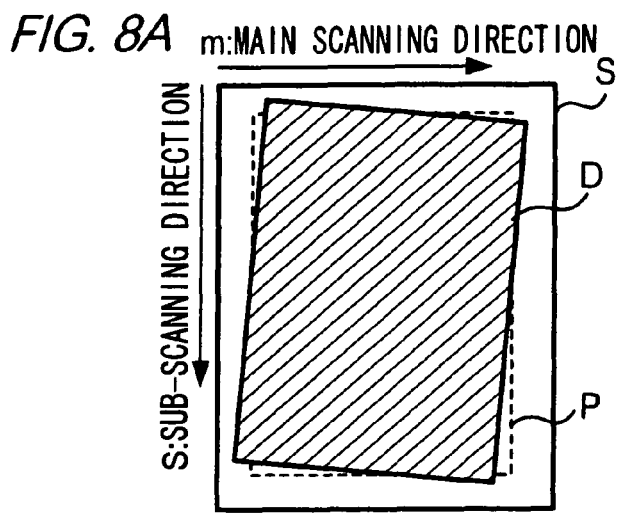
FIGS. 8A and 8B are diagrams illustrating a correction of side skew misalignment.
Figure 8B:
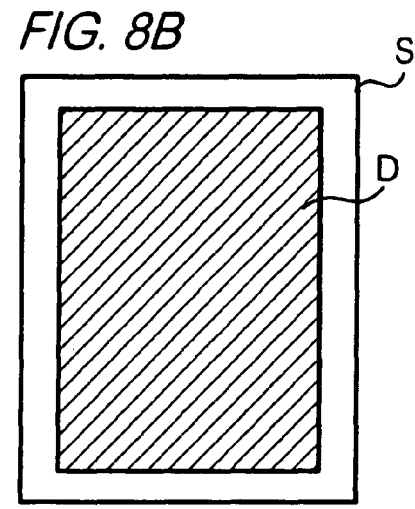
Figure 9:
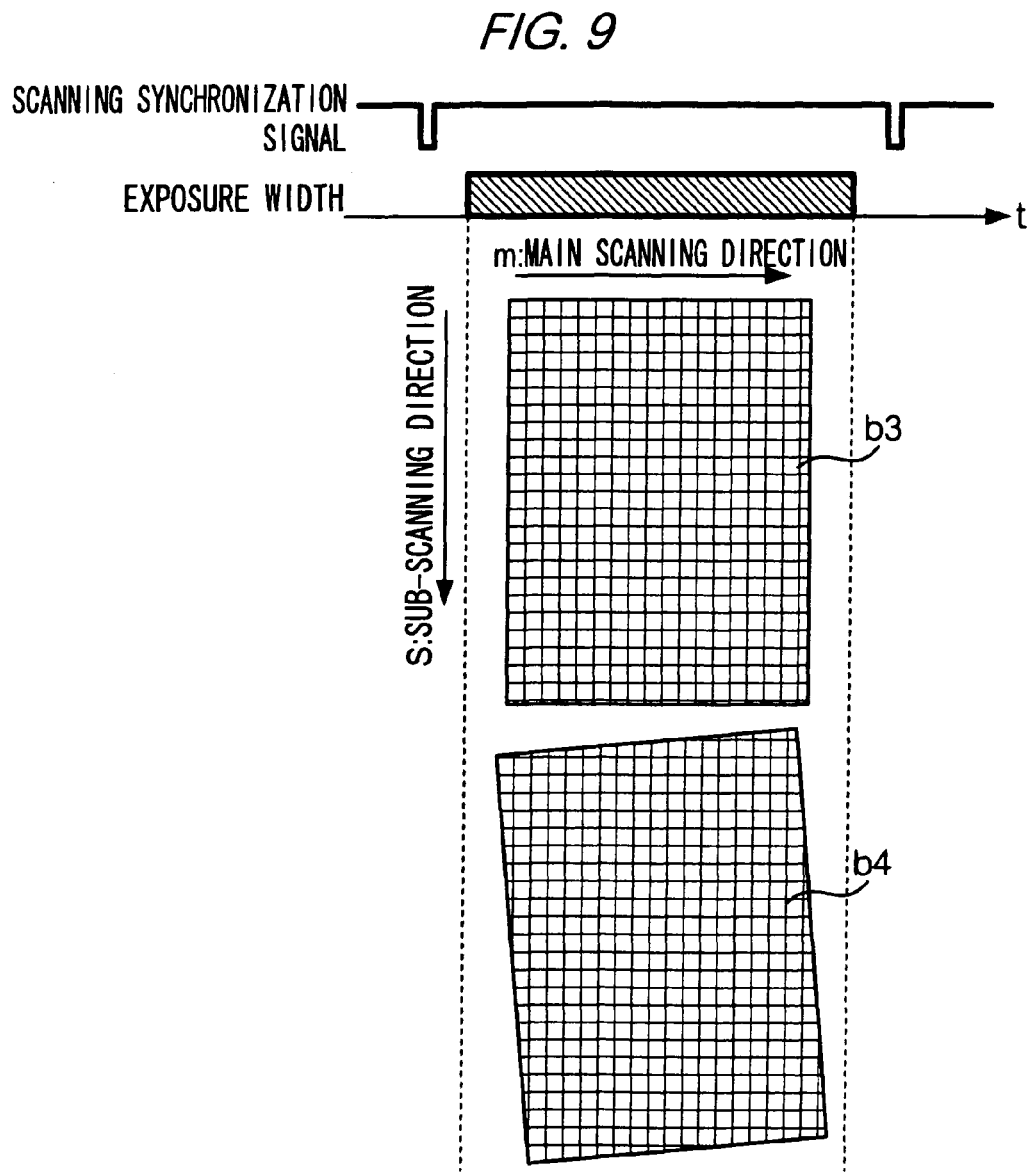
FIG. 9 is a diagram illustrating a correction of side skew misalignment.

FIG. 8A is a diagram illustrating side skew misalignment of image D formed on recording sheet S. As shown in the drawing, the whole image D is tilted, and therefore an image forming position of image D and ideal image forming position P do not correspond with each other. Accordingly, to correct such a misalignment, correcting unit 104 changes addresses of pixels contained in bitmap data b3 representing an image shown in FIG. 9 to generate bitmap data b4 representing an image which can offset the tilt of image D. Specifically, correcting unit 104 tilts an image represented by bitmap data b3 in a direction opposite to that of the tilt of image D shown in FIG. 8A, with an intersecting point of diagonal lines as a fulcrum. When an image is formed on the basis of bitmap data b4 on a recording sheet, an image forming position of image D and ideal image forming position P correspond with each other, as shown in FIG. 8B.

(1-4) Methods of Correcting Deficiency

When bitmap data is corrected by correcting unit 104 as described above, a part of the image represented by the bitmap may extend beyond an exposure width of an exposure unit, and therefore the part of the image is deficient. Deficiency amount calculating unit 106 shown in FIG. 1 calculates the amount of such a deficiency.

Figure 10:
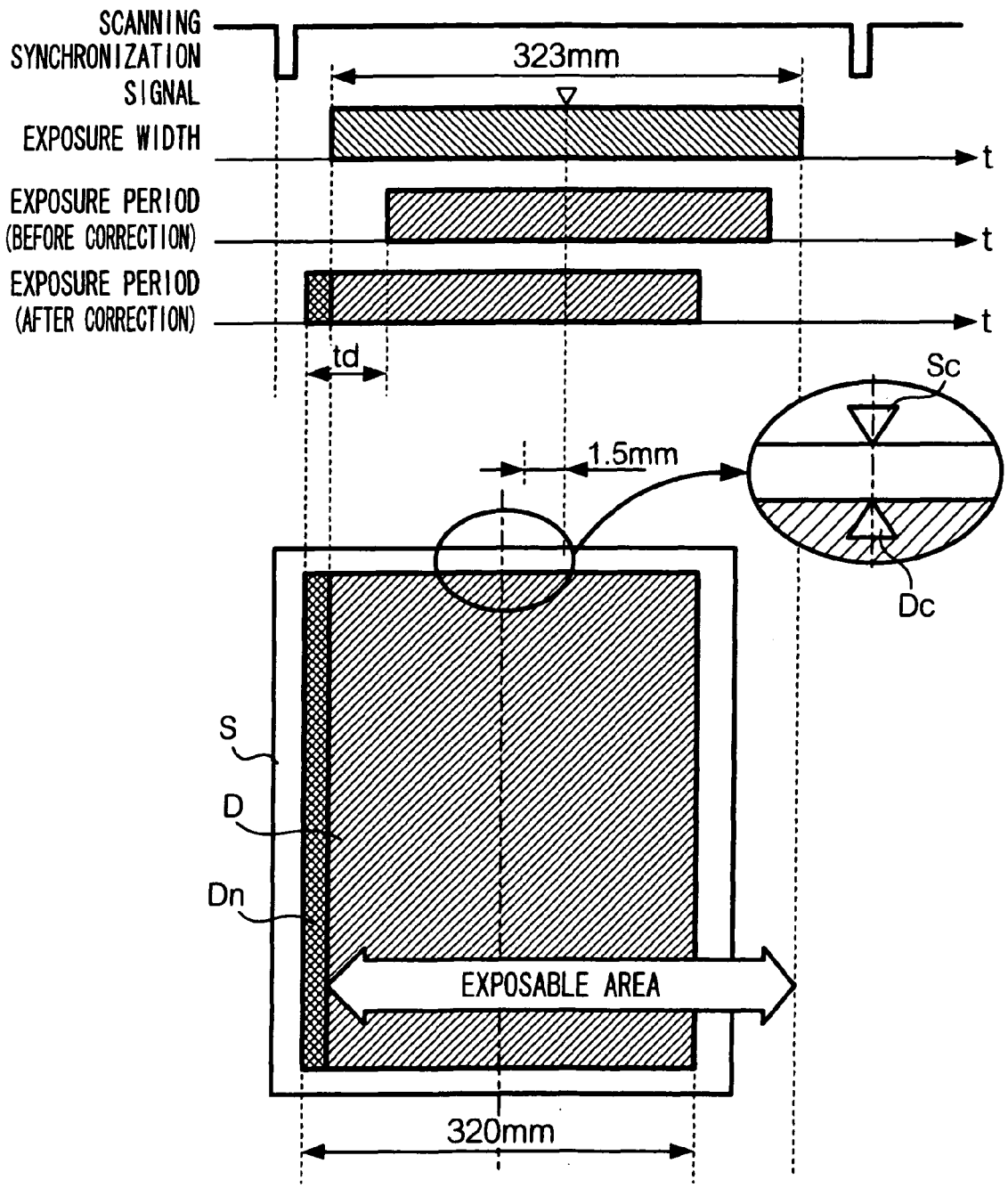
FIG. 10 is a diagram illustrating a mechanism by which a deficiency of an image is caused as a result of a correction of side registration misalignment.

FIG. 10 is a diagram illustrating a mechanism by which deficiency of an image is caused as a result of a correction of side registration misalignment. An exposure width shown in the drawing is set in consideration of an assumed maximum width in a main scanning direction of an image. For example, if a maximum width in a main scanning direction of an image to be formed is assumed to be 320 mm, an exposure width is set to be 323 mm which is slightly more than the maximum width.

When side registration misalignment is corrected, an amount of the correction depends on the length in a main scanning direction of an image and an exposure width. This is because, for example assuming that an exposure width is 323 mm and a width in a main scanning direction of an image is 320 mm, if the center of the image deviates from the center of the exposure width by more than 1.5 mm, a part of the image extends beyond the exposure width, and formation of a latent image of the part cannot be made. The part is deficiency area Dn whose image cannot be formed on a recording sheet. Center Dc in a main scanning direction of image D corresponds with center Sc in a main scanning direction of recording sheet S, as shown in the lower side of FIG. 10.

Figure 11:
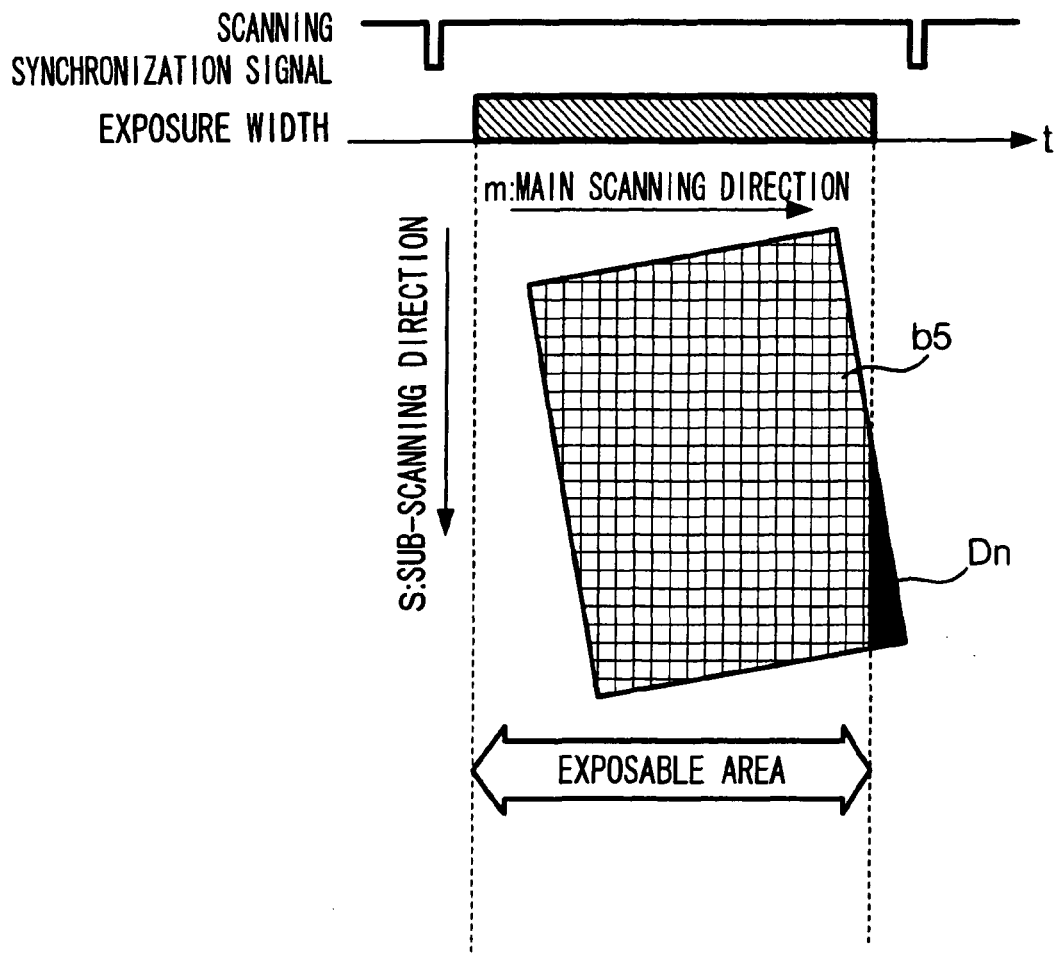
FIG. 11 is a diagram illustrating a mechanism by which a deficiency of an image is caused as a result of a correction of side registration misalignment and side skew misalignment.
Figure 12:
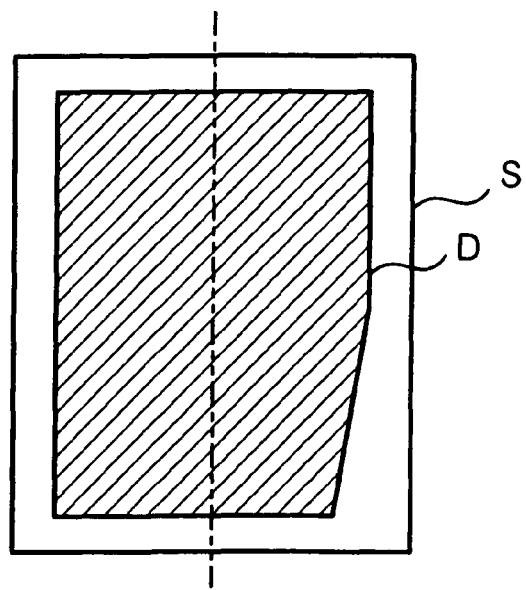
FIG. 12 is a diagram illustrating deficiency of an image caused as a result of a correction of side registration misalignment and side skew misalignment.

FIG. 11 is a diagram illustrating a mechanism by which deficiency of an image is caused as a result of a correction of side registration misalignment and side skew misalignment. In the drawing, since the lower right corner of an image represented by bitmap data b5 is beyond an exposure width, a latent image of the corner cannot be formed. Consequently, the corner will be deficiency area Dn where an image is not formed on a recording sheet. FIG. 12 is a diagram illustrating image D formed on recording sheet S. As shown in the drawing, an image of deficiency area Dn is deficient.

In order for deficiency amount calculating unit 106 to quickly calculate an amount of a deficiency on the basis of the size of an image, memory 107 stores deficiency amount table Ta as shown in FIG. 13 and an exposure width of an exposure unit.

Figure 14:
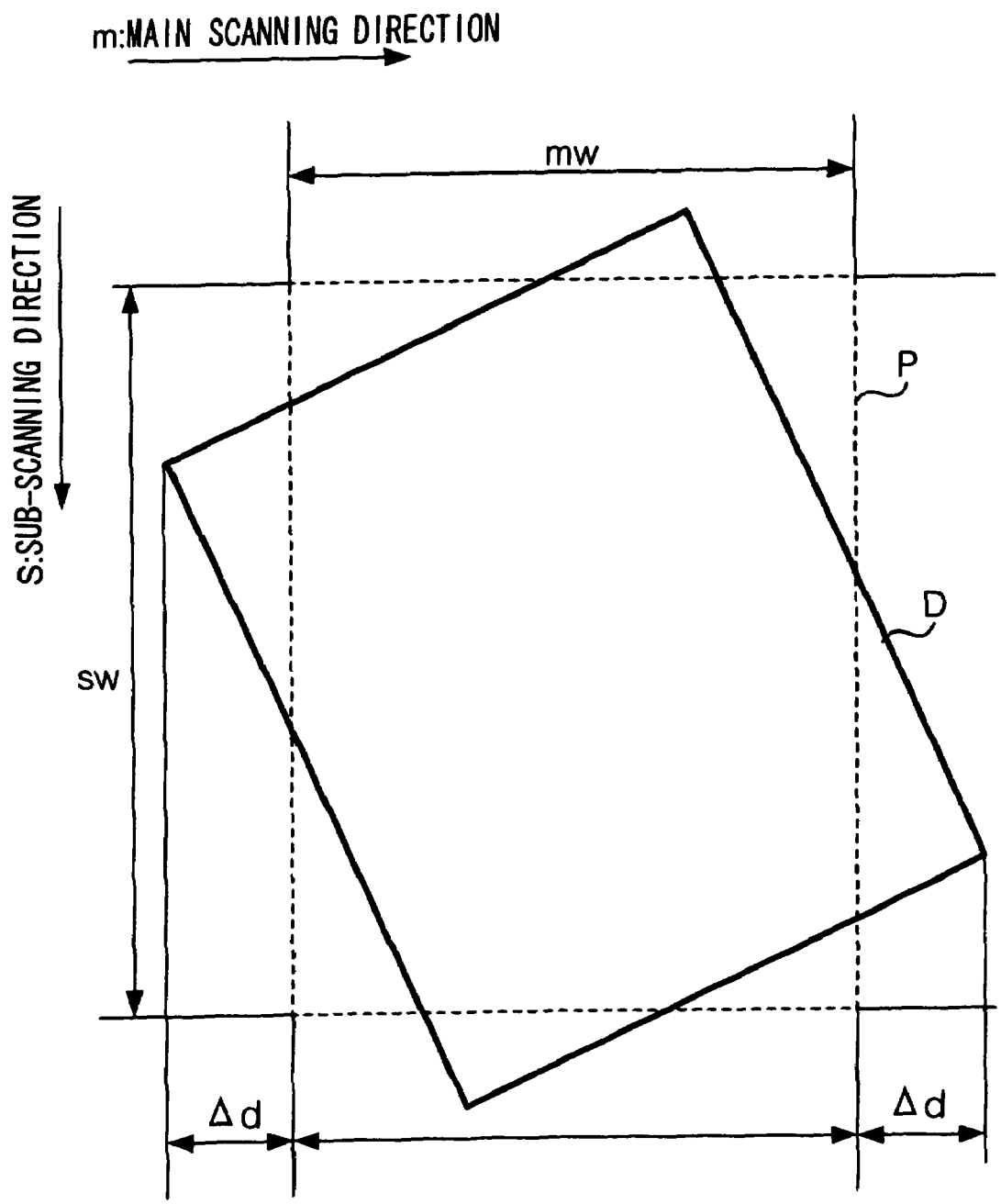
FIG. 14 is a diagram illustrating the length of a main scanning direction.

Deficiency amount table Ta stores varied pre-assumed sizes in a main scanning direction and in a sub-scanning direction of an image. An item "main" of an item "image size" of deficiency amount table Ta denotes a size in a main scanning direction of an image, and "sub" denotes a size in a sub-scanning direction of an image. An item "increase in width by side skew correction" of deficiency amount table Ta denotes an increase (=□d·2) in width in a main scanning direction of a latent image. As shown in FIG. 14, if a side skew of an image is corrected, a width in main scanning direction m of latent image D of the image formed by an exposure increases by □d·2 from width mv in main scanning direction m of the original image. The increase is an "increase in width by side skew correction". Values of the item "increase in width by side skew correction" are calculated on the basis of an amount of a correction calculated by correcting unit 104, and described in deficiency amount table Ta.

Figure 5:
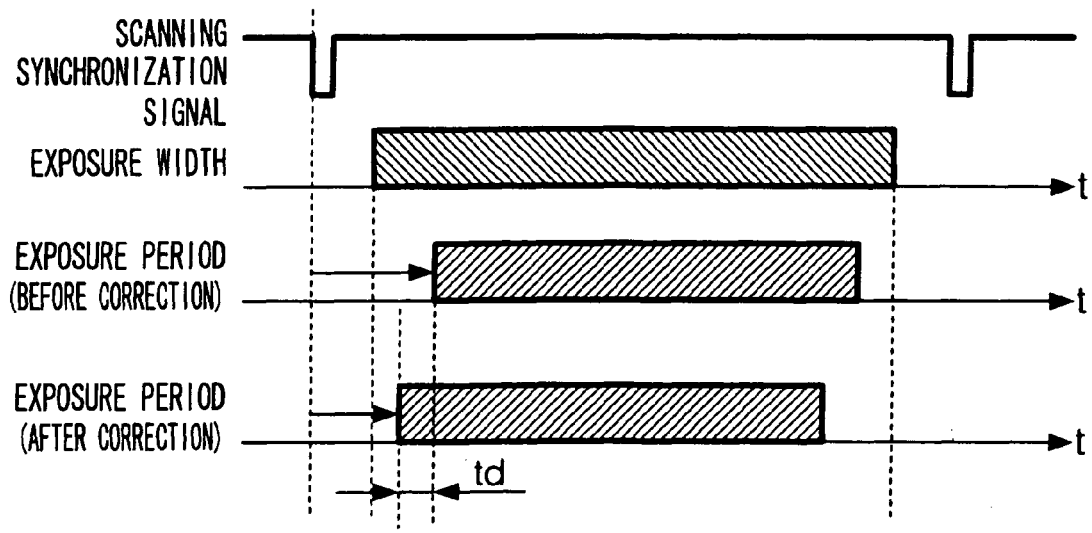
FIG. 5 is a diagram illustrating a correction of side registration misalignment.

An item "side registration correction amount" of deficiency amount table Ta denotes a distance by a latent image is moved in a main scanning direction or the opposite direction. As shown in FIG. 5 cited above, if side registration misalignment of an image is corrected, a latent image of the image formed by an exposure is moved in a main scanning direction. The distance is a "side registration correction amount". A "side registration correction amount" is equivalent to an amount of a correction calculated by correcting unit 104.

An item "fuser oscillation" of deficiency amount table Ta denotes a maximum value of a distance by which a recording sheet is moved in a main scanning direction or the opposite direction. A "fuser oscillation" is an operation of changing an insertion position of a recording sheet between a fixing roll and a pressure roll of a fixing unit in a direction orthogonal to a carrying direction. The operation is carried out to prevent only a part of a fixing roll from being worn by cumulative contacts with recording sheets.

An item "color registration correction amount" of deficiency amount table Ta denotes a maximum value of a distance by which a toner image of at least one of four colors C (Cyan), M (Magenta), Y (Yellow), and K (Black) is moved in a main scanning direction or the opposite direction. A displacement of a toner image is made in a case where toner images of the four colors do not correspond with each other.

An item "image width" of deficiency amount table Ta denotes a width in a main scanning direction of a latent image formed by an exposure, and a value of which is a sum of a value of "main" of "image size" and a value of "increase in width by side skew correction". An item "lateral fluctuation range" of deficiency amount table Ta denotes a range of fluctuation in a main scanning direction or the opposite direction of a position of a latent image, a value of which is a sum of a value of "side registration correction amount", a value of "fuser oscillation", and a value of "color registration correction amount". Accordingly, assuming that a value of "main" of "image size" is 297 mm, a value of "increase in width by side skew correction" is 3.15 mm, a value of "side registration correction amount" is ±4 mm, a value of "fuser oscillation" is ±2 mm, a value of "color registration correction amount" is ±2 mm, a width in a main scanning direction of a latent image is 297+3.15=300.15 mm, and a range of fluctuation in a main scanning direction or the opposite direction of a position of a latent image is 4+2+2=±8 mm. An item "exposure width margin (one side)" denotes a margin of an exposure width on one side in a main scanning direction of an image, and a value of which is a value of an exposure width minus a value of a width in a main scanning direction of a latent image and a value of a maximum fluctuation range, divided by two. Accordingly, under the assumption just described, if an exposure width is 323 mm, a value of "exposure width margin (one side)" is {323−(300.15+8·2)}/2=3.425, which is nearly equal to 3.43 (mm).

If a value of "exposure width margin (one side)" is positive, it means that there is a margin of an exposure width on one side in a main scanning direction of an image, and namely a deficiency of an image does not occur.

As another example, assuming a case where a value of "main" of "image size" is 304 mm, a value of "increase in width by side skew correction" is 3.29 mm, and a value of "image width" is 304+3.29=307.29 (mm). Accordingly, a value of "exposure width margin (one side)" is {323−(307.29+8·2)}/2=−0.145, which is nearly equal to −0.14 (mm). The value is negative, which means that a deficiency of an image will occur. The value "0.14 (mm)" is equivalent to an amount of a deficiency of an image, and if converted into the number of pixels, which is equivalent to 0.14/(25.4/2400) =13.2, which is nearly equal to 13 (pixels). This means that an area of an image having a width in a main scanning direction of 13 pixels will lack.

(1-5) Method of Correcting Misalignment in Consideration of Deficiency of an Image When a deficiency of an image described above occurs, correcting unit 104 deducts an amount of the deficiency from a calculated amount of a correction to obtain an actual amount of a correction, and corrects addresses of pixels contained in bitmap data by the obtained actual amount of a correction. By the re-correction of bitmap data, a deficiency of an image can be prevented. Correcting unit 104 provides the corrected bitmap data to image forming unit 109, and image forming unit 109 forms an image on a recording material on the basis of the bitmap data.

Next, variations of a method of correcting misalignment in consideration of a deficiency of an image by correcting unit 104 will be described below.

<First Correcting Method>

Figure 15:
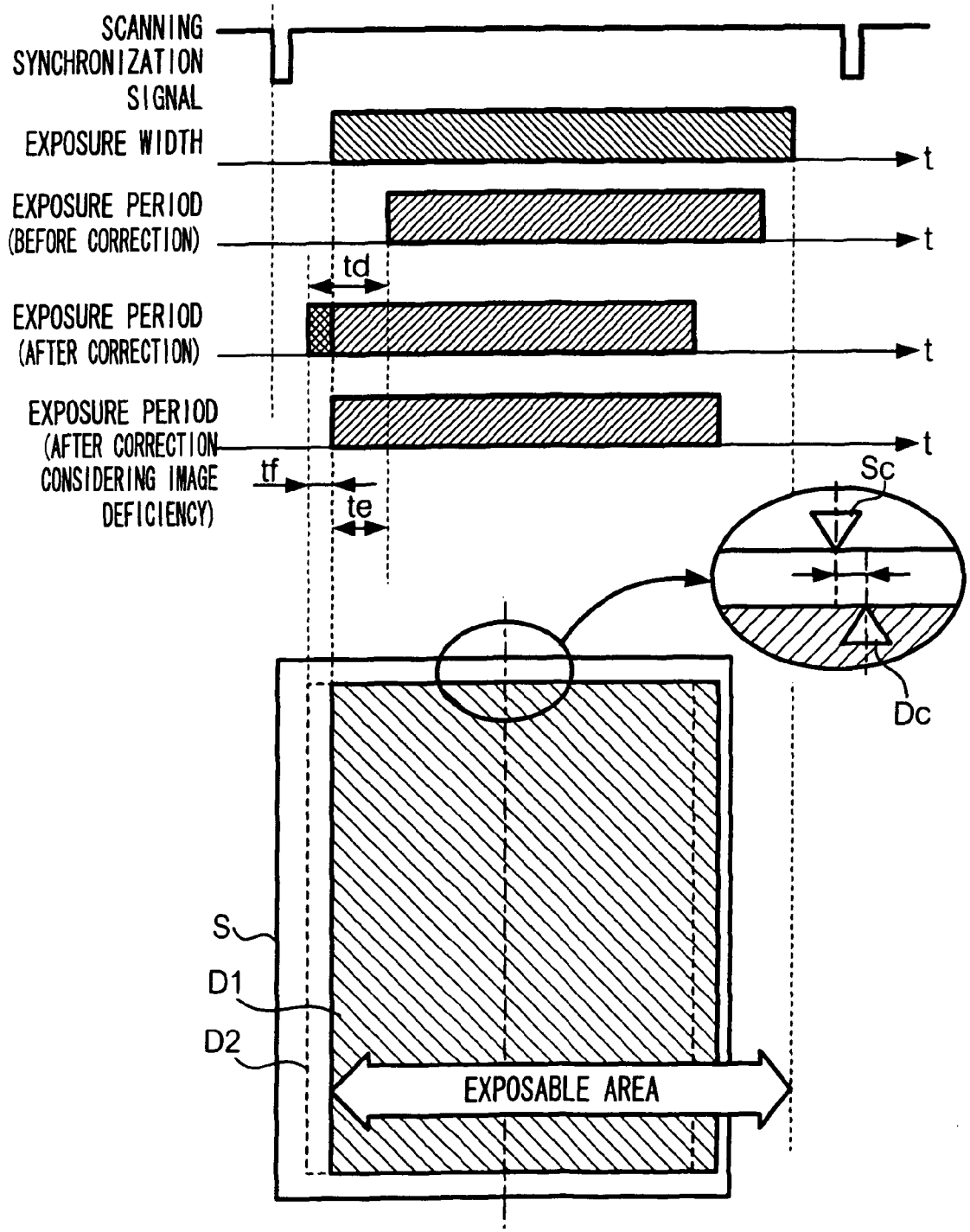
FIG. 15 is a diagram illustrating a first correction method.

In a case of side registration misalignment as shown in FIG. 15, if an image forming position is moved in a main scanning direction by a value obtained after deducting an amount of a deficiency from an amount of a correction, a deficiency of an image does not occur. Accordingly, correcting unit 104 corrects addresses of pixels contained in bitmap data so that an image forming position is moved by a distance corresponding to a value obtained after deducting an amount of a deficiency from an amount of a correction. Consequently, as shown in a time chart of FIG. 15, the timing of starting an exposure for bitmap data that is corrected in consideration of a deficiency of an image is moved forward by term te as compared with that for bitmap data of pre-correction. In contrast, the timing of starting an exposure for bitmap data is corrected but a deficiency of an image is not considered to have been moved forward by term td as compared with that for bitmap data of precorrection. Term td corresponds to an amount of a correction, and term tf corresponds to an amount of a deficiency. Terms td, te, and tf have a relationship of td−te=tf. Also, as a result of the correction of addresses of pixels contained in bitmap data, an image forming position of an image is changed, as shown in the lower side of FIG. 15, from an image forming position of image D2 to an image forming position of image D1. Center Dc in a main scanning direction of image D1 does not correspond with center Sc in a main scanning direction of recording sheet S.

In a case of a combination of side registration misalignment and side skew misalignment as shown in the upper side of FIG. 16, as in the case of side registration misalignment described above, an image forming position of an image is moved in a direction opposite to a main scanning direction by a value obtained after deducting an amount of a deficiency from an amount of a correction. Specifically, correcting unit 104 corrects addresses of pixels contained in bitmap data so that an image forming position is moved by a distance corresponding to a value obtained after deducting an amount of a deficiency from an amount of a correction. As a result of the correction, an image forming position of an image is changed, as shown in the lower side of FIG. 16, from an image forming position of image D2 to an image forming position of image D1. Center Dc in a main scanning direction of an image does not correspond with center Sc in a main scanning direction of a recording sheet.

<Second Correcting Method>

Figure 17:
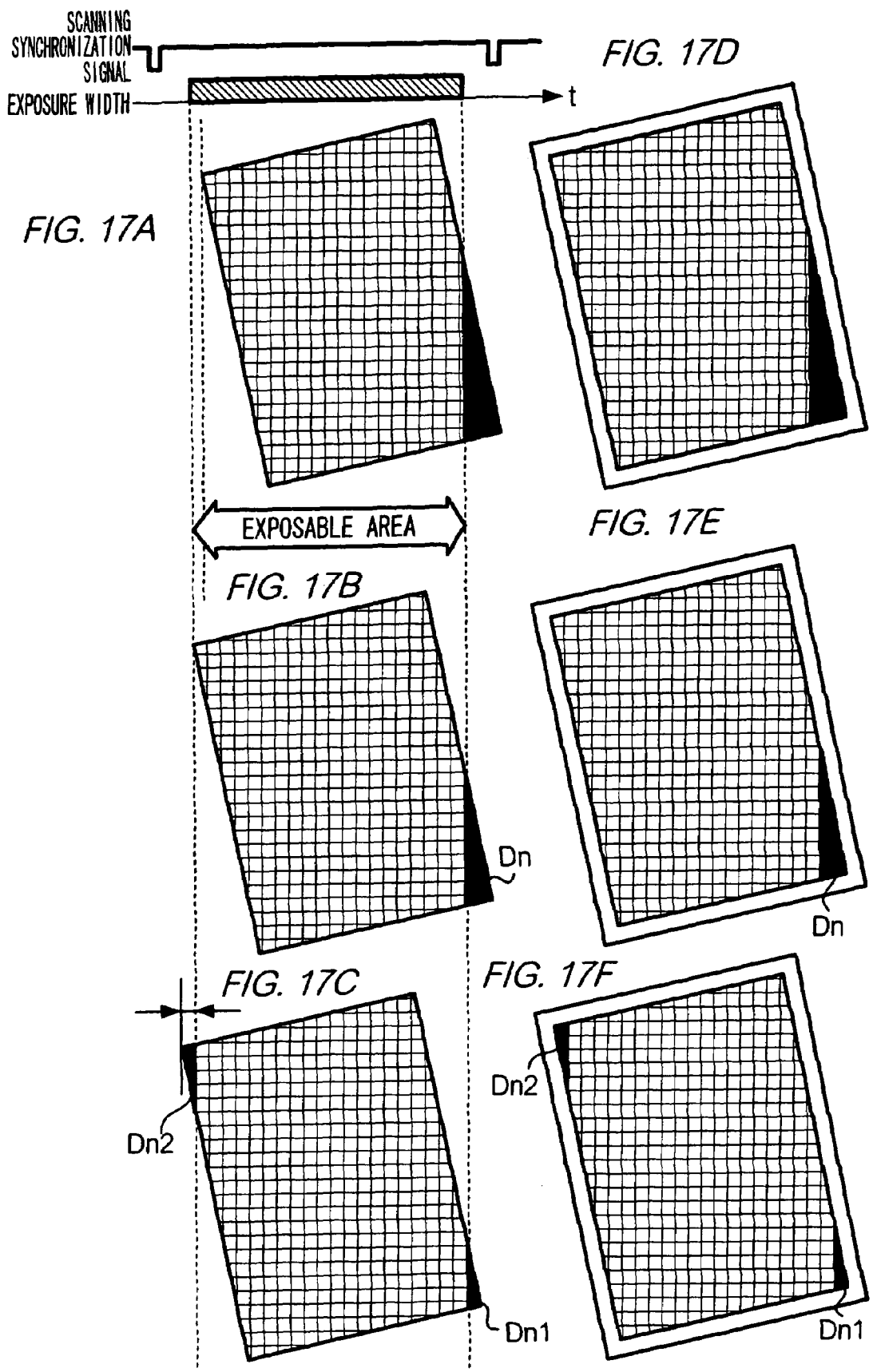
FIG. 17 is a diagram illustrating a second correction method.

In a case where both side registration misalignment and side skew misalignment are corrected, and an amount of a deficiency is large as shown in FIG. 17A, the deficiency may not be overcome by moving an image forming position by a value obtained after deducting an amount of the deficiency from an amount of a correction. For example, if an image is 480 mm long and 320 mm wide, and the width in a main scanning direction (mv+□·2 ) of the image is 323.6 mm, the width in a main scanning direction of the image is larger than an exposure width of 323 mm by 0.6 mm, and therefore an image having a width in a main scanning direction of 0.6 mm will be deficient. To address the problem, correcting unit 104 makes a correction so as to not leave deficiency area Dn on one side in a main scanning direction of an image, but to generate a deficiency area (deficiency area Dn1 and deficiency area Dn2) on both sides in a main scanning direction of an image, as shown in FIG. 17C. Specifically, correcting unit 104 changes addresses of pixels contained in bitmap data so that an image forming position is moved by a distance which is larger than a value obtained after deducting an amount of a deficiency from an amount of a correction, and less than or equal to the amount of a correction.

FIGS. 17D, 17E, and 17F correspond to FIGS. 17A, 17B, and 17C, respectively, and illustrate an image formed on a recording sheet on the basis of bitmap data representing an image of a corresponding figure.

<Third Correcting Method>

Figure 18:
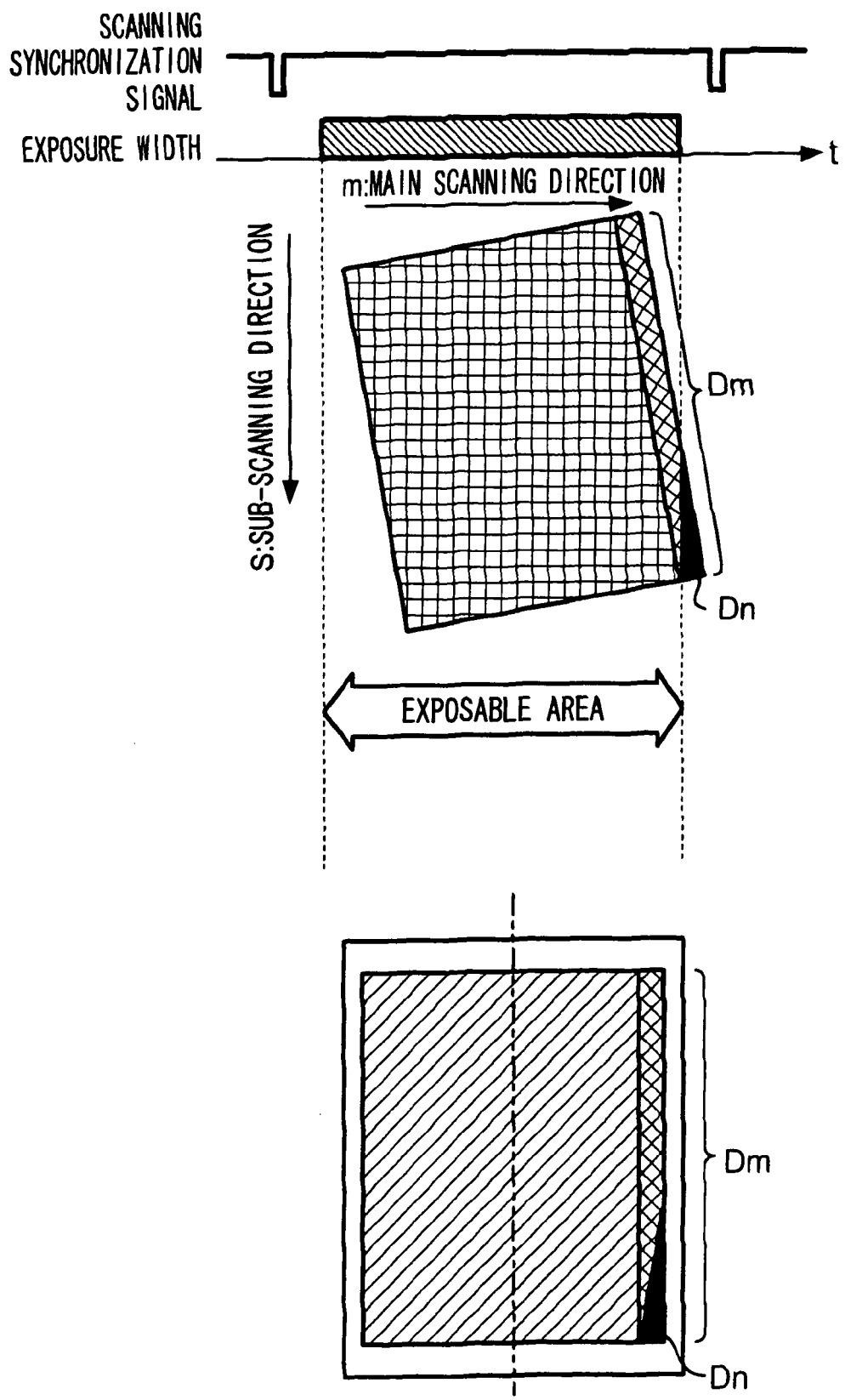
FIG. 18 is a diagram illustrating a third correction method.

In a case where both side registration misalignment and side skew misalignment occur, the lower right corner of an image, which takes the shape of a triangle, may lack, as shown in FIG. 11 cited above. If the image has a straight line near the right edge stretching from the top to the bottom parallel to the right side, the straight line may be disrupted in the middle due to the lack of the lower right corner. This type of a deficiency is conspicuous. To address the problem, correcting unit 104 masks bitmap data representing area Dm, which is shown in the upper side of FIG. 18 as an area with an oblique lattice pattern, so that an image within the area is not formed. As shown in the drawing, area Dm includes deficiency area Dn of an image, and is parallel to the right side of the image. As a result of the process, an image as shown in the lower side of FIG. 18 is formed on a recording sheet. It is to be noted that although the lower side of FIG. 18 shows area Dm on a recording sheet for an illustrative purpose, in fact no image is formed within area Dm.

<Fourth Correcting Method>

Figure 19:
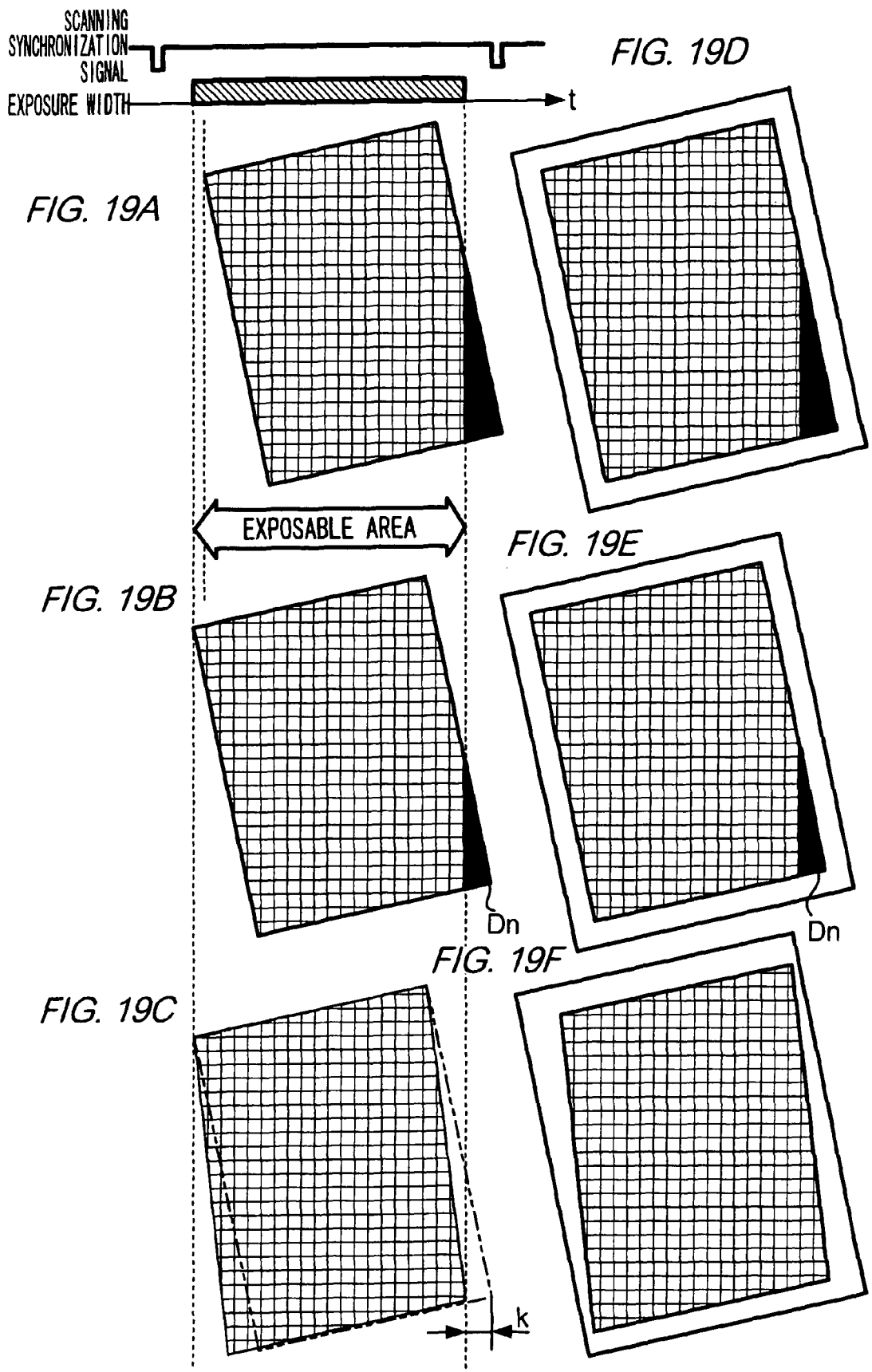
FIG. 19 is a diagram illustrating a fourth correction method.

In a case where both side registration misalignment and side skew misalignment are corrected, and an amount of a deficiency is large as shown in FIG. 19A, the deficiency may not be overcome by moving an image forming position by a value obtained after deducting an amount of the deficiency from an amount of a correction, as shown in FIG. 19B. To address the problem, correcting unit 104 changes addresses of pixels contained in bitmap data so that the width in a main scanning direction of an image represented by the bitmap data is compressed by an amount of a deficiency not overcome by the displacement of an image forming position. In the example shown in FIG. 19C, the width of an image is compressed by distance k in a main scanning direction.

FIGS. 19D, 19E, and 19F correspond to FIGS. 19A, 19B, and 19C, respectively, and illustrate an image formed on a recording sheet on the basis of bitmap data representing an image of a corresponding figure.

<Fifth Correcting Method>

Figure 20:
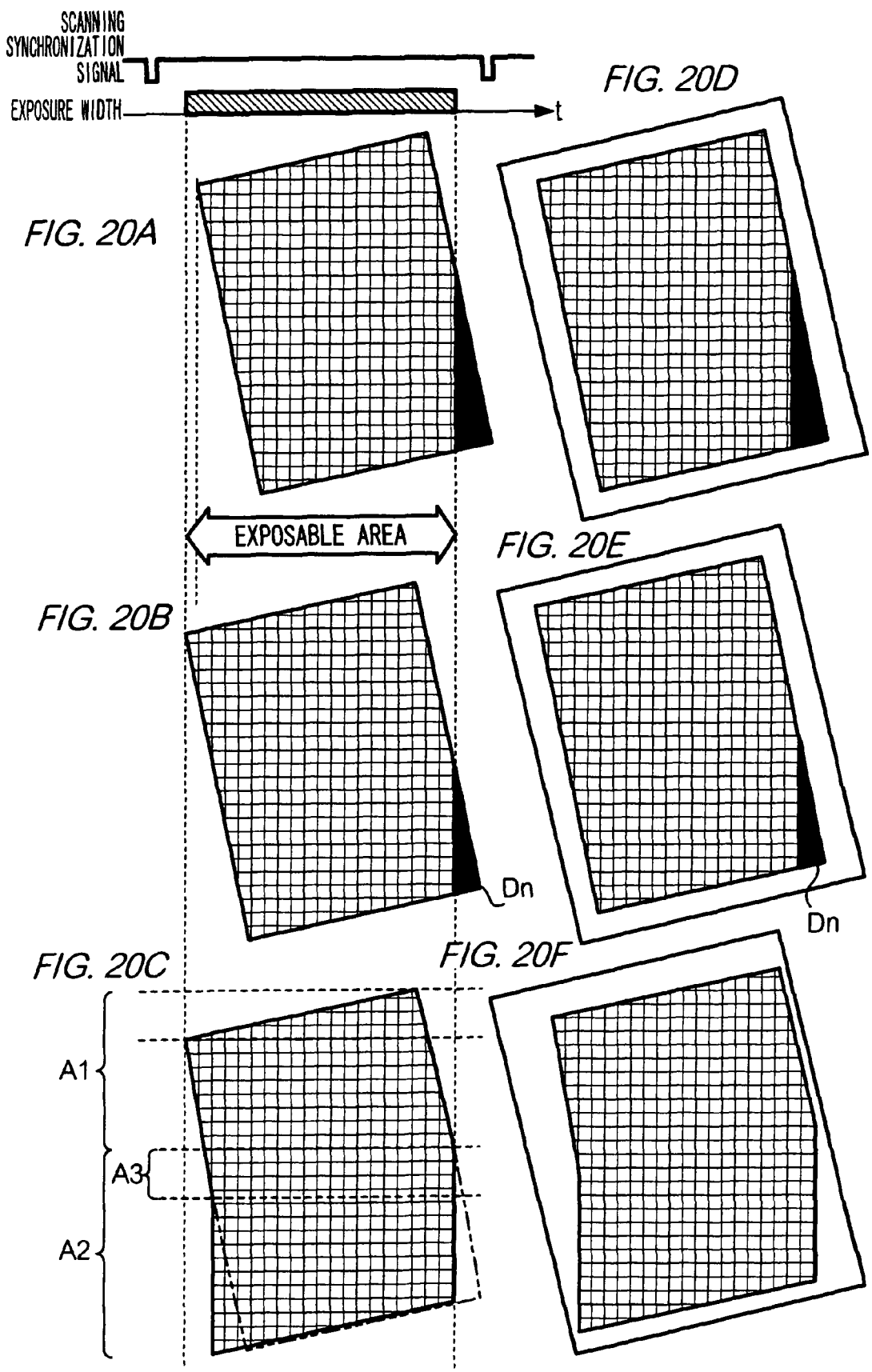
FIG. 20 is a diagram illustrating a fifth correction method.

In a case where both side registration misalignment and side skew misalignment are corrected, and an amount of a deficiency is large as shown in FIG. 20A, the deficiency may not be overcome by moving an image forming position by a value obtained after deducting an amount of the deficiency from an amount of a correction, as shown in FIG. 20B. To address the problem, correcting unit 104 moves an area including a deficiency depending on the amount of the deficiency. As explained specifically in FIG. 20C, correcting unit 104, with regard to a correction of image area A1, moves an image forming position by a value obtained after deducting an amount of the deficiency from an amount of a correction, to correct side registration misalignment and side skew misalignment. With regard to a correction of image area A2 including deficiency area Dn, correcting unit 104 changes addresses of pixels contained in bitmap data to eliminate a deficiency of an image. The correction includes a correction of image area A3 where the width of an image is compressed in a direction opposite to a main scanning direction. It is to be noted that the correction of image area A2 may be a correction to reduce a deficiency of an image.

The foregoing are correcting methods according to the present exemplary embodiment.

The correcting methods described above can eliminate or reduce a deficiency of an image, as described above. However, the correcting methods, at the same time, can cause the center in a main scanning direction of an image to deviate from the center in a main scanning direction of a recording sheet, which sometimes can contradict the wish of a user. To address the problem, image forming apparatus 10 according to the present exemplary embodiment has two operational modes of an "image quality priority mode" where elimination or reduction of a deficiency of an image is prioritized, and an "alignment priority mode" where matching of the center in a main scanning direction of an image and the center in a main scanning direction of a recording sheet is prioritized. An image quality priority mode is used mainly in a case where an image consisting of colored pixels exists in an area that is possibly deficient, and an alignment priority mode is used mainly in a case where an image consisting of colored pixels does not exist in an area that is possibly deficient. A selection of a mode may be made in accordance with a user's instruction via input unit 111, or made on the basis of a judgment made by correcting unit 104. In the latter case, whether an image consisting of colored pixels exists in an area that is possibly deficient is determined by correcting unit 104 based on an analysis of a value of each pixel of bitmap data. Bitmap data is generated by image forming apparatus 10 or host device 200 on the basis of PDL data through a ripping process.

(2) Operation

An operation of image forming apparatus 10 will be described with reference to a flowchart of FIG. 21.

When image data is input into image data input unit from host device 200 (Step S1; Yes), image data input unit converts the image data into bitmap data, and provides it to gradation correcting unit 102. Gradation correcting unit 102 performs a gradation correction of the bitmap data, and provides the corrected bitmap data to screen processing unit 103 (Step S2). Screen processing unit 103 performs a screen processing of the processed bitmap data to correcting unit 104 (Step S3). Correcting unit 104 stores the provided bitmap data in memory 107, and calculates an amount of a correction on the basis of an amount of a deviation measured by deviation amount measuring unit 105 (Step S4).

Subsequently, correcting unit 104 selects one of an image quality priority mode and an alignment priority mode (Step S5). This selection may be made, as described above, in accordance with a user's instruction, or made on the basis of the judgment made by correcting unit 104 as to whether an image consisting of colored pixels exists. The judgment is made on the basis of an analysis of a value of each pixel. If an alignment priority mode is selected (Step S5; Alignment Priority Mode), correcting unit 104 corrects bitmap data on the basis of the amount of a correction calculated at Step S4 (Step S6). This correction is a correction without consideration of a deficiency of an image.

On the other hand, if an image quality priority mode is selected (Step S5; Image Quality Priority Mode), correcting unit 104 instructs deficiency amount calculating unit 106 to calculate an amount of a deficiency of an image with reference to deficiency amount table Ta (Step S7). If a deficiency of an image does not occur, an amount of a deficiency calculated by deficiency amount calculating unit 106 is zero. After an amount of a deficiency is calculated by deficiency amount calculating unit 106, correcting unit 104 determines whether the calculated amount of a deficiency exceeds a threshold value (Step S8). At the stage of the determination, assuming that the threshold amount is zero, if even a fraction of a deficiency of an image occurs, an affirmative determination is made at Step S8. Alternatively, assuming that the threshold amount is 1 mm, if the amount of a deficiency exceeds 1 mm, an affirmative determination is made at Step S8. On the other hand, if the amount of a deficiency does not exceed the threshold amount (Step S8; NO), correcting unit 104 corrects bitmap data on the basis of the amount of a correction calculated at Step S4 (Step s6). Namely, correcting unit 104 makes a correction without consideration of a deficiency of an image.

If the amount of a deficiency exceeds the threshold amount (Step S8; YES), correcting unit 104 selects one of the first to fifth correcting methods described above (Step S9). A criterion for the selection of a correcting method may be a type of misalignment. The criterion being employed, for example, if side registration misalignment is corrected, the first correcting method is selected, and if both side registration misalignment and side skew misalignment are corrected, one of the second, third, fourth, and fifth correcting methods is selected. Alternatively, a criterion for the selection of a correcting method may be whether a deficiency of an image is overcome by moving an image forming position by a value obtained after deducting an amount of the deficiency from an amount of a correction. The criterion being employed, for example, if a deficiency of an image is overcome, one of the first and third correcting methods is selected, and if a deficiency of an image is not overcome, one of the second, fourth, and fifth correcting methods is selected. Alternatively, a criterion for the selection of a correcting method may be whether an image of a line stretching in a sub-scanning direction exists in an area that is possibly deficient. The criterion being employed, for example, if such a situation arises the third correcting method is selected.

Correcting unit 104 corrects bitmap data using the correcting method selected at Step S9 (Step S10), and provides the corrected bitmap data to image forming unit 109 (Step S11). Image forming unit 109 forms an image on a recording sheet on the basis of the bitmap data as described above.

(3) Modification

The exemplary embodiment described above may be modified as described below.

Image forming apparatus 10 may be, instead of a tandem type image forming apparatus, a single-engine-4-cycle color image forming apparatus or a type of an image forming apparatus where an exposure and development process is made on a drum or a belt of a photoreceptor repeatedly for each of four colors so that a layered toner image of the four colors is formed on the photoreceptor. Alternatively, image forming apparatus 10 may be, instead of a color image forming apparatus, a black-and-white image forming apparatus with an alignment correction capability. An image forming system of image forming unit 109 may be, instead of an electrophotographic system, an inkjet method or any type of a method by which an image can be formed on the basis of image data where addresses of pixels are changed.

In the above exemplary embodiment, where an amount of a deviation is measured by deviation amount measuring unit 105, an amount of a deviation may be measured by an external device. An external device receives a test pattern output from image forming unit 109, and measures an amount of a deviation on the basis of the test pattern. The amount of a deviation measured by the external device is input to image processing unit 100. According to the modification, image processing unit 100 is not provided with a deviation amount measuring unit 105, but an interface for receiving an amount of a deviation from an external device.

In the above exemplary embodiment, methods of correcting misalignment in consideration of a deficiency of an image are described with reference to a case where side registration misalignment and/or side skew misalignment is corrected. However, the methods are effective also in a case where a magnification correction, which corrects the width in a main scanning direction of an image by increasing the number of pixels, is made. Especially, in a case where a magnification correction is made in combination with a correction of side registration misalignment and side skew misalignment, since an amount of a deficiency is likely to be large, the methods are effective.

In the above exemplary embodiment, where an exposure width is referred to for determining an amount of a deficiency of an image, a width in a main scanning direction where a development can be made by image forming unit 109 or a width in a main scanning direction from which a toner image can be transferred by image forming unit 109 may be used as a reference width. Alternatively, a reference width may be a maximum width in a main scanning direction of a page memory. A page memory is provided in a commonly used image processing unit, and stores image data to be developed in the main and the sub-scanning directions. If a maximum width in a main scanning direction of a page memory is used as a reference width, a deficiency of an image is overcome in the third correcting method described above or a correcting method where bitmap data is corrected so that the width of an image is compressed laterally depending on the amount of the deficiency.

In the above exemplary embodiment, a correction of an image forming position on the basis of an amount of a deficiency may be made by a method other than changing addresses of pixels contained in image data such as bitmap data. The functions of image processing unit 100 may be achieved by hardware or software.

In the above exemplary embodiment, where image processing unit 100 is a computer with built in image forming apparatus 10, image processing unit 100 may be a host device of image forming apparatus 10.

Figure 21:
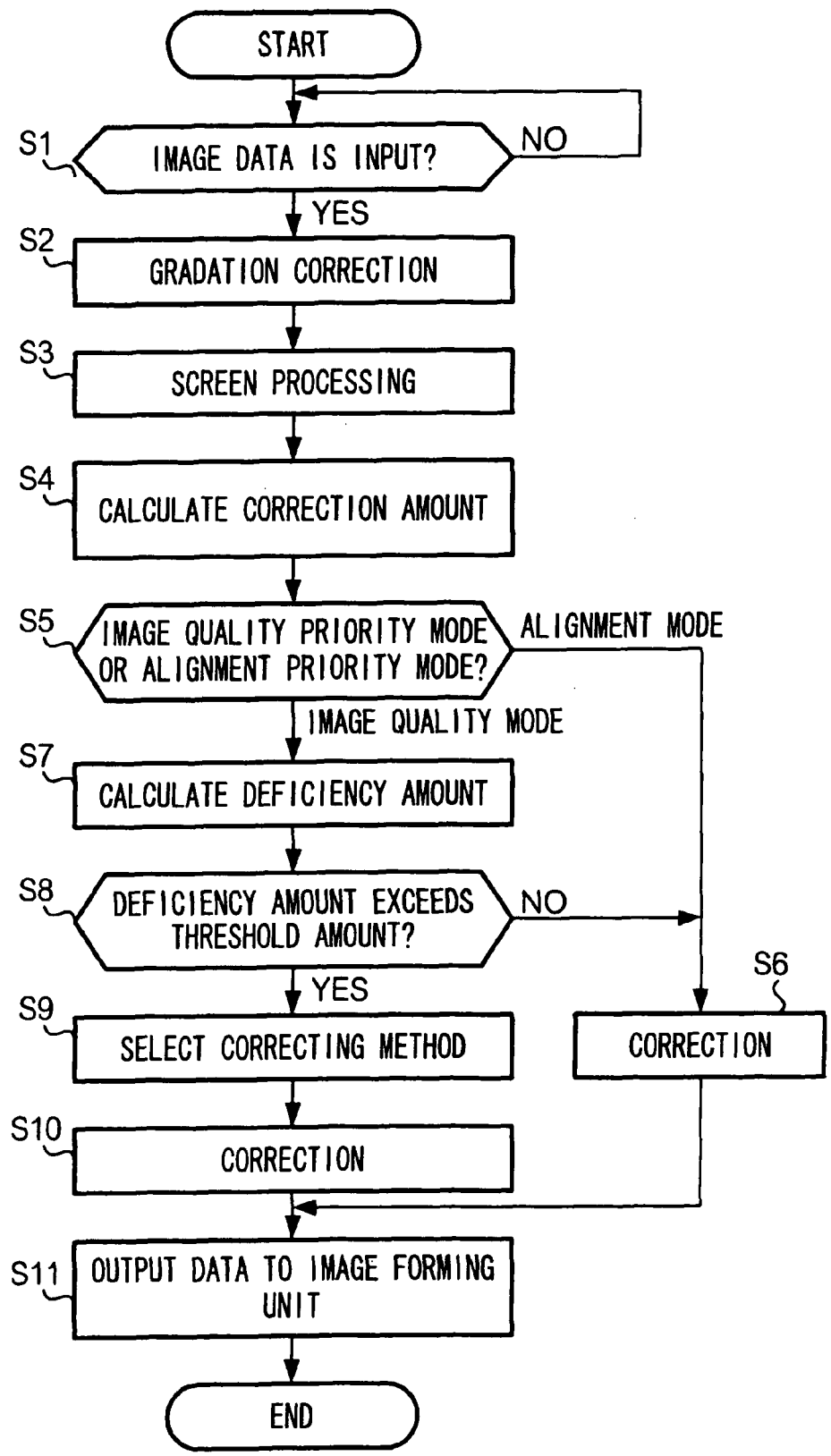
FIG. 21 is a flowchart of an operation according to an exemplary embodiment of the present invention.

In the above exemplary embodiment, a procedure shown in FIG. 21 may be described as a program, and the program may be provided to image processing unit 100 via a computer readable medium such as a magnetic recording medium, an optical recording medium, or a ROM. Alternatively, the program may be provided to image processing unit 100 via a network such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   an image forming unit that forms an image on a recording medium, by exposing an image holder to form a latent image, developing the latent image to form a toner on the image holder, and transferring the toner image from the image holder to the recording medium, which is carried in a sub-scanning direction;
   a memory unit that stores an exposure width in a main scanning direction where an exposure can be made by the image forming unit, and a table that stores an image size, an amount of a correction to be used for correcting a deviation of an image forming position, and a margin of the exposure width on one side in the main scanning direction of an image that has the image size, image data of which is corrected on the basis of the amount of the correction;

a deviation amount obtaining unit that obtains an amount of a deviation formed on a recording medium by the image forming unit;

a correcting unit that calculates an amount of a correction to used for correcting an image forming position of the image to be formed by the image forming unit, on the basis of the amount of the deviation of the deviation obtained by the deviation amount obtaining unit, to correct image data of the image to be formed, on the basis of the calculated amount of the correction and a deficiency amount calculating unit that calculates an amount of a deficiency of the image, which occurs in an area beyond the exposure width where exposure can not be made by the image forming unit, as a result of the correction by the correcting unit with reference to the margin of the exposure width stored in the table associated with the image size of the image to be formed in the calculated amount of the correction, the correcting unit being further configured to correct image data of the image to be formed by the image forming unit, on the basis of the amount of the deficiency calculated by the deficiency amount calculating unit.

2. An image processing apparatus comprising:

a memory unit that stores an exposure width in a main scanning direction where an exposure can be made by an image forming unit, and a table that stores an image size, an amount of a correction to be used for correcting a deviation of an image forming position, and a margin of an exposure width on one side in the main scanning direction of an image that has the image size, image data of which is corrected on the basis of the amount of the correction;

a correcting unit that calculates an amount of a correction to used for correcting an image forming position of the image to be formed by the image forming unit, on the basis of an amount of the deviation of the deviation obtained bY the deviation amount obtaining unit, to correct image data of the image to be formed, on the basis of the calculated amount of the correction and a deficiency amount calculating unit that calculates an amount of a deficiency of the image, which occurs in an area beyond the exposure width where exposure can not be made by the image forming unit, as a result of the correction by the correcting unit with reference to the margin of the exposure width stored in the table associated with the image size of the image to be formed in the calculated amount of the correction, the correcting unit being further configured to correct image data of an image to be formed by the image forming unit, on the basis of the amount of the deficiency calculated by the deficiency amount calculating unit.

3. The image processing apparatus according to claim 2, wherein the correcting unit corrects the image data so that the image forming position is moved substantially parallel to the exposure width by a distance corresponding to a difference between the amount of the deviation and the amount of the deficiency calculated by the deficiency amount calculating unit.

4. The image processing apparatus according to claim 2, wherein the correcting unit, if the deficiency of the image occurs even after the image forming position is moved substantially parallel to the exposure width by a distance corresponding to a difference between the amount of the deviation and the amount of the deficiency calculated by the deficiency amount calculating unit, corrects the image data so that the image forming position is moved substantially parallel to the exposure width by the distance which is larger than the difference and less than or equal to the amount of the deviation.

5. The image processing apparatus according to claim 2, wherein the correcting unit corrects the image data so that the image in an area including the deficiency is not formed.

6. The image processing apparatus according to claim 2, wherein the correcting unit, if the deficiency of the image occurs even after the image forming position is moved substantially parallel to the exposure width by a distance corresponding to a difference between the amount of the deviation and the amount of the deficiency calculated by the deficiency amount calculating unit, corrects the image data so that the image is compressed by an amount corresponding to an amount of the deficiency which occurs even after the image position is moved by the distance corresponding to the difference, substantially parallel to the exposure width.

7. The image processing apparatus according to claim 2, wherein the correcting unit, if the deficiency of the image occurs even after the image forming position is moved substantially parallel to the exposure width by a distance corresponding to a difference between the amount of the deviation and the amount of the deficiency calculated by the deficiency amount calculating unit, corrects the image data so that an area including the deficiency which occurs even after the image position is moved by the distance corresponding to the difference, is moved on the basis of the amount of the deficiency.

8. The image processing apparatus according to claim 2, further comprising a selecting unit that selects whether to make a correction by the correcting unit, wherein the correcting unit, if making the correction is selected by the selecting unit, makes the correction.

9. The image processing apparatus according to claim 8, wherein the selecting unit selects making the correction, if the image consisting of colored pixels exists in the area where the deficiency of an image occurs.

10. The image processing apparatus according to claim 8, wherein the selecting unit selects making the correction, if the amount of the deficiency calculated by the deficiency amount calculating unit exceeds a threshold amount.

11. The image processing apparatus according to claim 8, wherein the selecting unit selects whether to make the correction by the correcting unit on the basis of an instruction from a user.

12. The image processing apparatus according to claim 2, wherein:

the correcting unit utilizing at least two correcting methods among the following correcting methods:

a first correcting method by which the image data is corrected so that the image forming position is moved substantially parallel to the exposure width by a distance corresponding to a difference between the amount of the deviation and the amount of the deficiency calculated by the deficiency amount calculating unit;

a second correcting method by which if the deficiency of an image occurs even after the image forming position is moved substantially parallel to the exposure width by the distance corresponding to the difference between the amount of the deviation and the amount of the deficiency calculated by the deficiency amount calculating unit, the image data is corrected so that the image forming position is moved substantially parallel to the exposure width by the distance which is larger than the difference and less than or equal to the amount of the deviation;

a third correcting method by which the image data is corrected so that the image in an area including the deficiency is not formed;

a fourth correcting method by which if the deficiency of the image occurs even after the image forming position is moved substantially parallel to the exposure width by the distance corresponding to the difference between the amount of the deviation and the amount of the deficiency calculated by the deficiency amount calculating unit, the image data is corrected so that the image is compressed by the amount corresponding to the amount of the deficiency which occurs even after the image position is moved by the distance corresponding to the difference, substantially parallel to the exposure width; and a fifth correcting method by which if the deficiency of an image occurs even after the image forming position is moved substantially parallel to the exposure width by the distance corresponding to the difference between the amount of the deviation and the amount of the deficiency calculated by the deficiency amount calculating unit, the image data is corrected so that an area including the deficiency which occurs even after the image position is moved by the distance corresponding to the difference, is moved on the basis of the amount of the deficiency, the image processing apparatus further comprises a correcting method selecting unit that selects one of the at least two methods, and causes the correcting unit to make a correction by the selected correcting method.

13. A non-transitory computer readable medium storing a program for causing a computer to execute;

storing an exposure width in a main scanning direction where an exposure can be made;

accessing a table that stores an image size, an amount of a correction to be used for correcting a deviation of an image forming position, and a margin of the exposure width on one side in the main scanning direction of an image that has the image size, image data of which is corrected on the basis of the amount of the correction;

correcting image data of an image to be formed on a recording medium, on the basis of an amount of a deviation of an image forming position of the image relative to the recording medium;

calculating an amount of a deficiency of the image, which occurs in an area beyond the exposure width where exposure can not be made, as a result of the correction with reference to the margin of the exposure width stored in the table associated with the image size of the image to be formed in the calculated amount of the correction; and correcting image data of the image to be formed, on the basis of the calculated amount of the deficiency.

* * * * *